(12) United States Patent
Canas et al.

(10) Patent No.: US 12,277,277 B2
(45) Date of Patent: Apr. 15, 2025

(54) UNIVERSAL KEYBOARD

(71) Applicant: ArithmeType LLC, North Oaks, MN (US)

(72) Inventors: Shannon Canas, North Oaks, MN (US); Shawn McClintock, Dazey, ND (US)

(73) Assignee: Arithme Type LLC, North Oaks, MN (US)

( * ) Notice: Subject to any disclaimer, the term of this patent is extended or adjusted under 35 U.S.C. 154(b) by 0 days.

(21) Appl. No.: 18/599,535

(22) Filed: Mar. 8, 2024

(65) Prior Publication Data
US 2024/0302907 A1    Sep. 12, 2024

Related U.S. Application Data

(60) Provisional application No. 63/489,299, filed on Mar. 9, 2023.

(51) Int. Cl.
*G06F 3/02* (2006.01)
*G06F 3/023* (2006.01)

(52) U.S. Cl.
CPC .......... *G06F 3/0219* (2013.01); *G06F 3/0233* (2013.01)

(58) Field of Classification Search
CPC ...... G06F 3/023; G06F 3/0202; G06F 3/0219; G06F 3/0233
See application file for complete search history.

(56) References Cited

U.S. PATENT DOCUMENTS 5,682,151 A * 10/1997 Oliveros ................. G06F 3/023
708/142

* cited by examiner

*Primary Examiner* — Priyank J Shah
(74) *Attorney, Agent, or Firm* — DeWitt LLP

(57) ABSTRACT

A dedicated-subject universal keyboard simplifies symbol entry by grouping numbers, common letters, operations, symbols, and special characters for use with any operating system or device.

20 Claims, 27 Drawing Sheets

FIG. 8C1

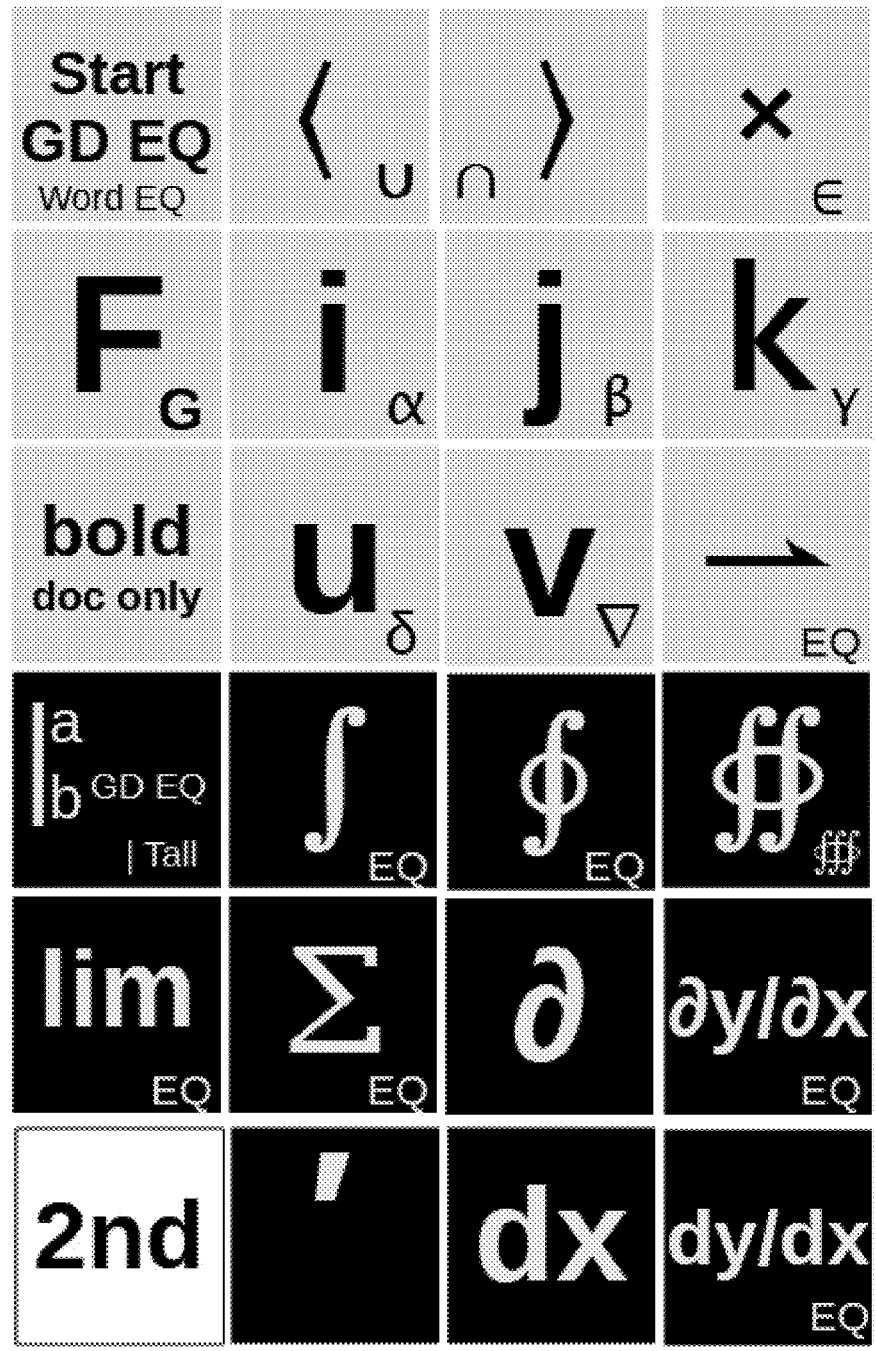
FIG. 8C2

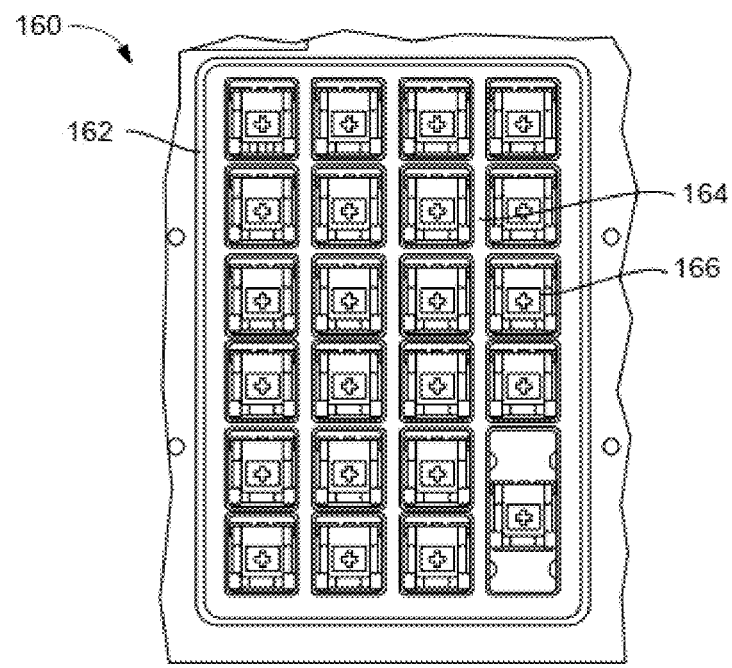
FIG. 9B1
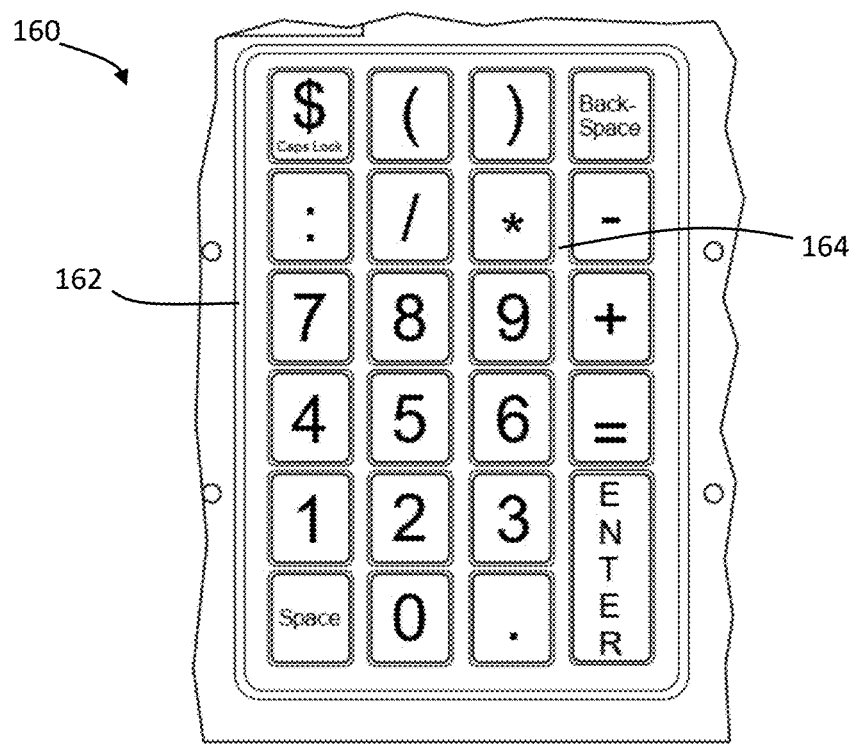
FIG. 9B2

FIG. 11B

UNIVERSAL KEYBOARD

CROSS-REFERENCE TO RELATED APPLICATIONS

The present application claims the benefit of U.S. Provisional Application No. 63/489,299 filed Mar. 9, 2023, which is hereby incorporated herein in its entirety by reference.

TECHNICAL FIELD

Embodiments relate generally to keyboards. More particularly, embodiments relate to universal keyboards.

BACKGROUND

Entering mathematical notation on a standard QWERTY keyboard is difficult. Typically, in order to access math characters and symbols, users are required to press multiple keys (for example, to access ALT codes) or use complex and tedious software-based menus having expansive options which are too time consuming to use fluidly when typing math notation. This process is especially difficult for users with special needs, or those who have classes or jobs that require frequent use of these keys and characters (i.e., mathematic or engineering fields). In addition to the increasing digital presence in mathematics versus handwriting, some people simply cannot write, due to motor, visual, neurological, or other disability. Being able to type math notation therefore is essential.

Certain existing keyboards can offer some entry of particular math symbols, but these keyboards are typically not intuitive or easy to use. Further, because math characters are variable across operating systems and editors/platforms, existing keyboards are platform and operating system-dependent. Additionally, certain software-based math add-ons or apps are non-intuitive and require refined motor skills to select characters or operations with a mouse or scratchpad. Software-based add-ons are also operating system-specific.

Further, users with special needs may have difficulty typing language using a standard QWERTY keyboard for letter entry due to the placement of letters, the required dexterity in use, and the large number of keys all grouped together.

Therefore, there is a need for a keyboard that is intuitive and easy to use, and which can be universally used across any operating system and platform.

SUMMARY

Embodiments described or otherwise contemplated herein substantially meet the aforementioned needs of the industry. In an embodiment, a dedicated-subject universal keyboard simplifies symbol entry by grouping numbers, common letters, operations, symbols, and special characters for use with any operating system or compatible computing device.

Math characters are typically variable across operating systems and editors/platforms. Many keyboard character shortcuts rely on ASCII but those are very OS and platform-dependent. Embodiments described herein transcend those differences in one keyboard. Embodiments utilize characters from a QWERTY keyboard as well through the addition of Unicode. Embodiments further allow for the changing of operating systems via the keyboard. This allows OS-specific sequences for keyboard functions, such as cut and paste, or variations in Unicode characters depending on the OS versions, which may change over time. For example, the standard Unicode pi symbol in the most recent Ventura update of MacOS was no longer recognized, and an alternate Unicode character needed to be chosen. Embodiments further allow for future customization, as well as allowing the user the ability to update their devices easily, so that they only require a code update for new or expanded configurations, without requiring the necessity of purchasing a new overall device.

In a feature and advantage of embodiments, a universal keyboard comprises keys that are mapped to mathematical numbers, common math letters, mathematical operations, mathematical symbols, and special mathematical characters. The keys are organized such that similar or related keys are placed spatially in close proximity to each other. Accordingly, a user avoids having to constantly change focus over long distances between keys, resulting in a fluid user experience.

In an embodiment, a keyboard comprises a plurality of logically-ordered sections of keys. For example, keys can be grouped by common use together (e.g. Geometry symbol functions placed relatively near each other in a common section, and less than, greater than, estimator symbols placed relatively near each other in a common section). In an embodiment, a keyboard comprises three discrete sections. A first section comprises early elementary characters, like numbers 0-9 and simple mathematical instructions like addition, subtraction, division, and multiplication. A second section comprises building blocks from the early elementary characters, such as less than, greater, than, estimator, and percentage symbols, which would typically be used as later elementary characters. A third section comprises more complex symbols like trigonometric functions, exponential functions, and more complex Greek symbols for constants and special functions. Accordingly, the separate sections intuitively build on each other. Such grouping and section organization contrasts with existing keyboards, which either do not have such individual keys or are unorganized, which require a user to learn individual key locations. In another example, keys can be grouped by letter, such as on a letter keyboard. The arrangement of keys can be sequential to an alphabet in contrast to a traditional QWERTY layout. Such arrangement can assist users with special needs as well as to assist younger users to learn to type.

In an embodiment in another logical ordering of sections of keys, a first section comprises at least some keys having a first plurality of associated functions such as basic navigation up arrow-down arrow-left arrow-right arrow, or cut-copy-paste, or a subset of simple mathematical instructions such as greater than-less than-equal to or greater than-equal to or less than. A second section comprises at least some keys having a second plurality of associated functions, such as numbers 0-9 or simple mathematical instructions like addition, subtraction, division, and multiplication. A third section comprises at least some keys having a third plurality of associated functions, such as sin-cos-tan trigonometric functions or $x^2$, $y^3$, $z^4$ as algebraic functions.

In another feature and advantage of embodiments, a keyboard can be used with any computing device or any operating system. Accordingly, the keyboard is universal across devices. For example, embodiments of the keyboard can seamlessly interface with CHROME, LINUX, MAC, and WINDOWS operating systems, and others. In contrast with some existing keyboards, the user does not need to program the keyboard for a specific operating system or platform prior to use.

Many existing keyboard character shortcuts rely on ASCII, which are OS and platform-dependent. In contrast, Embodiments described herein utilize characters from a QWERTY keyboard and Unicode character encoding to hold a Unicode code point. Unicode utilizes a standard character set that represents all natural language characters, including math characters.

Moreover, embodiments utilize information about the coupled operating system to implement OS-specific commands or to update Unicode commands. For example, a user can change operating systems via a button, multi-position switch, or other suitable selector on the keyboard. In other embodiments, the operating system can be detected by automatic detection of the OS once the keyboard is operably coupled to the computing device.

Determining the OS allows the keyboard to communicate OS-specific sequences for keyboard functions, such as cut and paste, or variations in Unicode characters depending on the OS version, which may change over time. For example, the standard Unicode pi symbol in a Ventura update of MacOS was no longer recognized, and an alternate Unicode character needed to be chosen. Embodiments of the keyboard processor allows for future customization as needed, as well as allowing the end user ability to update devices, so that code updates for new or expanded configurations can be downloaded to the keyboard without requiring the purchase of a new keyboard.

In another feature and advantage of embodiments, the keyboard offers multi-sensory input to aid the user. For example, the keys feature large font with brightly contrasted colors, and related keys are grouped by the same color to assist with visual recall of position. Moreover, the integrated components create a "clicky" tactile key press, which can be felt by touch and proprioception as well as heard by the user. Such tactile interaction is created by the specific components of the keyboard, including the particular switches utilized. Multi-sensory input helps funnel focus and develop input skills for those users with disabilities. Embodiments of letter keyboards have the same multisensory benefits to help reinforce learning motor movements in typing language.

In an embodiment, a keyboard comprises a first key section comprising a first plurality of keys in a first grid having a number of rows greater than a number of columns; a second key section comprising a second plurality of keys in a second grid having a number of rows greater than a number of columns; a third key section comprising a third plurality of keys in a third grid having a number of rows greater than a number of columns, wherein the number of columns of the first grid, the second grid, and the third grid are the same; and a housing that physically separates the first key section from the second key section by a first portion of the housing having a first width and the second key section from the third key section by a second portion of the housing having a second width, wherein the first width and the second width are substantially the same.

In an embodiment, a keyboard system comprises a primary keyboard including: a first key section comprising a first plurality of keys in a first grid having a number of rows greater than a number of columns, a second key section comprising a second plurality of keys in a second grid having a number of rows greater than a number of columns, a third key section comprising a third plurality of keys in a third grid having a number of rows greater than a number of columns, a primary keyboard housing defining three apertures corresponding respectively to the first key section, the second key section, and the third key section, wherein the number of columns of the first grid, the second grid, and the third grid are the same; a plurality of switches corresponding to the first plurality of keys, the second plurality of keys, and the third plurality of keys; at least one processor and memory operably coupled to the processor; and instructions that, when executed by the at least one processor, cause the at least one processor to execute: an input/output (I/O) engine configured to receive input of a key press from the plurality of switches, and a formatting engine configured to tailor the input as a packet for a host computer.

In an embodiment, a method for universal keyboard communication comprises providing a keyboard including: a first key section comprising a first plurality of keys in a first grid having a number of rows greater than a number of columns, a second key section comprising a second plurality of keys in a second grid having a number of rows greater than a number of columns, a third key section comprising a third plurality of keys in a third grid having a number of rows greater than a number of columns, wherein the number of columns of the first grid, the second grid, and the third grid are the same; an actuator configured to mechanically switch between a plurality of host computer operating systems; receiving actuator input from the actuator indicative of a selected host computer operating system; receiving key input from the first plurality of keys, the second plurality of keys, or the third plurality of keys; formatting a tailored packet of the key input for the host computer specific to the host computer operating system based on the actuator input; and transmitting the tailored packet to the host computer.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 8C1 is a block diagram of a keycap layout of the supplemental keyboard of FIG. 8B, according to an embodiment.

FIG. 8C2 is a block diagram of a keycap layout of the supplemental keyboard of FIG. 8B, according to another embodiment.

FIG. 9B1 is a top perspective view of a keyguard for a universal keyboard illustrated without keycaps, according to an embodiment.

FIG. 9B2 is a top perspective view of a keyguard for a universal keyboard illustrated with keycaps, according to an embodiment.

FIG. 11B is a block diagram of a letter keyboard with number pad, according to another embodiment.

Figure 1:
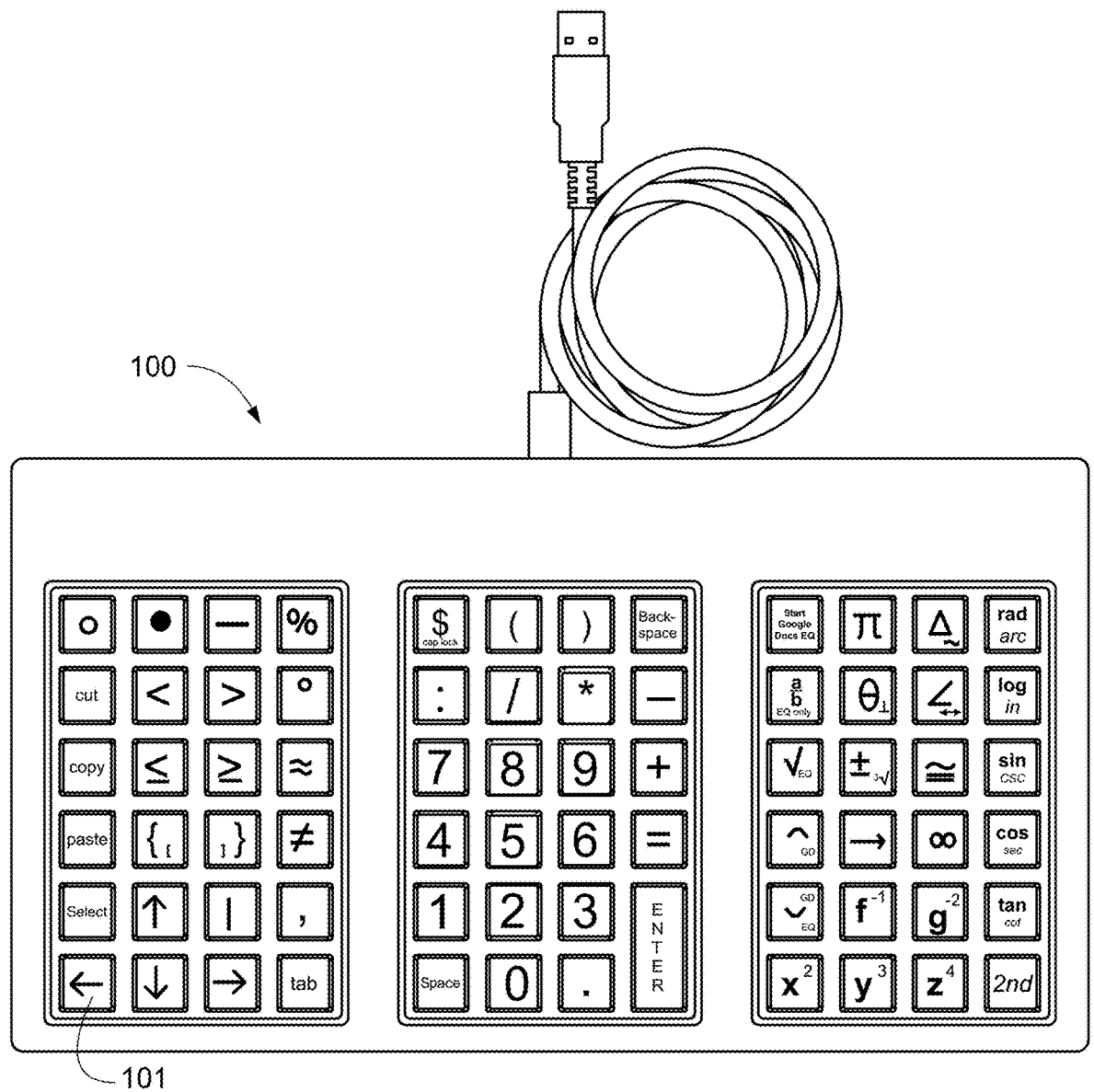
FIG. 1 is a top perspective view of a universal keyboard, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2A:
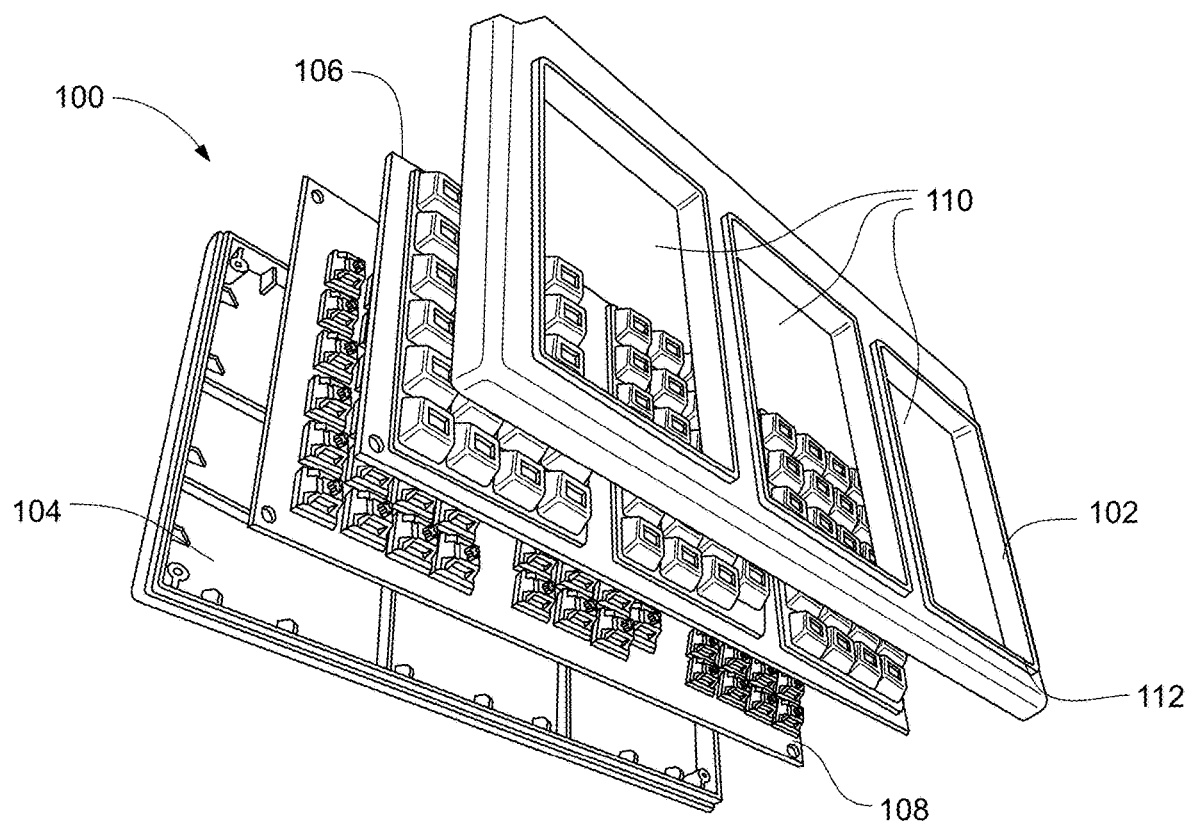
FIG. 2A is an exploded top perspective view of the universal keyboard of FIG. 1, according to an embodiment.

For the sake of convenience and ease of discussion, the terms "keyboard," "universal keyboard," "math keyboard" and/or "letter keyboard" may be used interchangeably for ease of discussion. Referring to FIG. 1, a top perspective view of a universal keyboard 100 is depicted, with keys (or "keycaps") 101, according to an embodiment. Referring also to FIG. 2A, in which an exploded top perspective view of keyboard 100 is depicted, and FIG. 2B, in which an exploded bottom perspective view of keyboard 100 is depicted, according to an embodiment, keyboard 100 comprises a top shell portion 102, a bottom shell portion 104, a safety layer 106, and a PCB layer 108.

Top shell portion 102 and bottom shell portion 104 together form a housing for keyboard 100. Accordingly, top shell portion 102 and bottom shell portion 104 can be operably coupled together, for example, by screws, adhesive, or any other suitable fastener to enclose safety layer 106 and PCB layer 108. Top shell portion 102 and bottom shell portion 104 can be made of an injection molding material such as acrylonitrile, butadiene, and styrene (ABS).

When assembled, in an embodiment, the housing of top shell portion 102 and bottom shell portion 104 measures approximately 6.5 inches horizontal height, 11.75 inches horizontal width, and vertical height of 2.0 inches. In other embodiments, the housing can be of a different suitable size. In still other embodiments, a keyboard can comprise two sections of keys and be relatively smaller in horizontal width and height. In another embodiment, a keyboard can comprise only one section of keys and be relatively smaller in horizontal width and height.

Figure 2B:
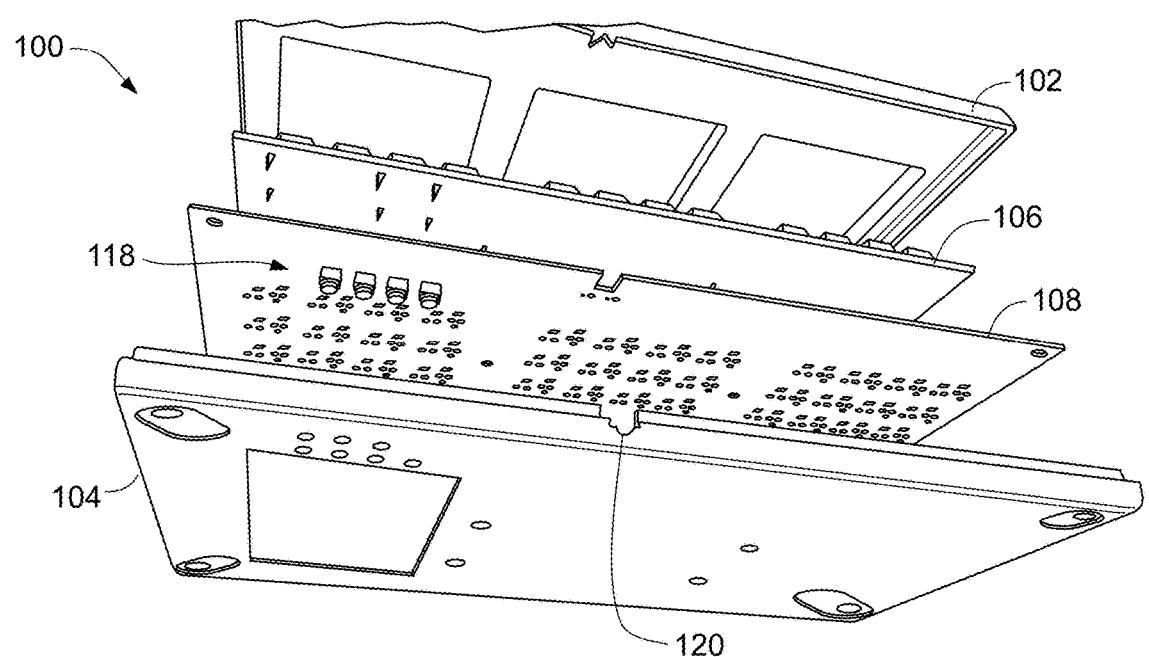
FIG. 2B is an exploded bottom perspective view of the universal keyboard of FIG. 1, according to an embodiment.

Top shell portion 102 comprises a plurality of apertures 110 configured to house a plurality of keycaps. As depicted in FIGS. 2A-2B, top shell portion 102 comprises three apertures 110, each aperture configured to contain the same plurality of keycaps. In other embodiments, top shell portion 102 can comprise differently-sized apertures or one, two, or four or more apertures.

In an embodiment, the section frames 112 creating plurality of apertures 110 project upwards from top shell portion 102 to allow the attachment of optional molded plastic section covers or keyguards (as will be described with respect to FIGS. 9A-9C).

Figure 3:
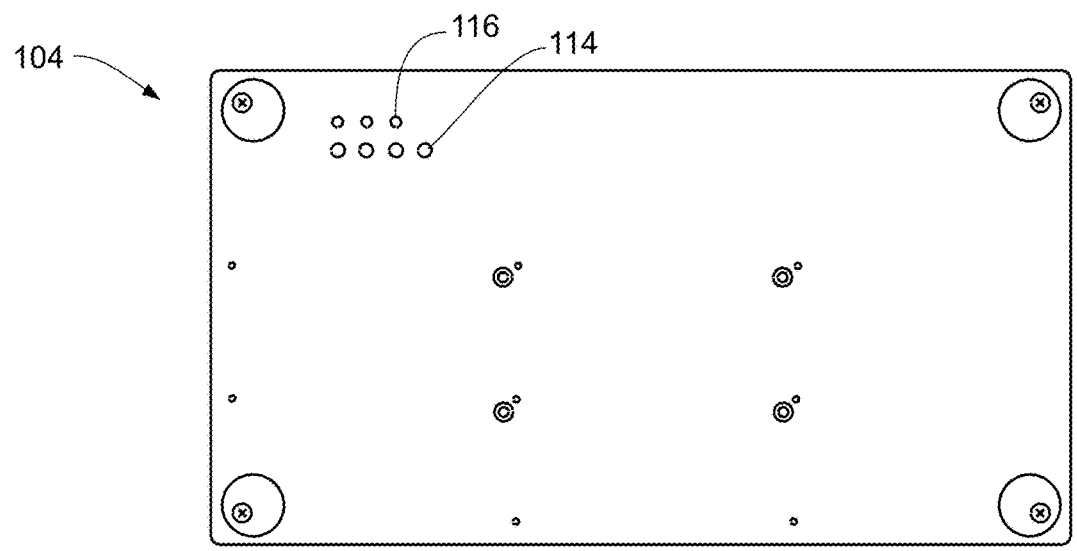
FIG. 3 is a bottom view of the universal keyboard of FIG. 1, according to an embodiment.

Referring also to FIG. 3, a bottom view of keyboard 100 is depicted, according to an embodiment. More specifically, FIG. 3 depicts bottom shell portion 104. In an embodiment, bottom shell portion 104 is similarly sized to top shell portion 102 to aid in a streamlined appearance of keyboard 100 when coupled to top shell portion 102.

In an embodiment, bottom shell portion 104 comprises a plurality of voids 114 for a plurality of actuators 118 which are visible slightly below the surface of the bottom shell portion 104. Plurality of actuators 118 will be described further with respect to PCB layer 108. bottom shell portion 104 further includes a plurality of voids 116 for exposing lights corresponding to the selected operating system.

In an embodiment, bottom shell portion 104 includes four 2 mm diameter voids 114 that are aligned in a row where actuators 118 are visible slightly below the surface of bottom shell portion 104. Bottom shell portion 104 further includes three 2 mm diameter voids 116 directly aligned with the three of plurality of voids 114 for LED lights corresponding to the Operating System (OS) selected by an actuator 118. As depicted in FIG. 3 a fourth actuator can correspond to an actuator related to rebooting keyboard 100.

In certain wired embodiments, as depicted in FIG. 2B, bottom shell portion 104 further comprises a void 120 to accommodate a wired connection. As depicted, void 120 is configured in the center top of bottom shell portion 104 to allow exit of a male micro USB-B cord, with the an opposing end being a male USB-A connector to connect to a computing device. A female USB-A to male USB-C may be needed for certain OS, (such as MACOS). In other embodiments, void 120 is larger or smaller to accommodate other wired connections. In other embodiments, bottom shell portion 104 does not include void 120, such as in wireless embodiments.

In embodiments, bottom shell portion 104 can further comprise rubber positioned on the surface of bottom shell portion 104 for anti-skid protection.

Referring again to FIGS. 2A-2B, safety layer 106 comprises a ruggedized shell substantially mirroring the projections of PCB layer 108. For example, a plurality of switches projecting from PCB layer 108 are received by corresponding receiving openings of safety layer 106. Accordingly, safety layer 106 is positioned proximate to PCB layer 108, between top shell portion 102 and bottom shell portion 104 and is configured to fit PCB layer 108.

In an embodiment, safety layer 106 comprises a durable plastic (e.g. silicone) to eliminate weak points relative to PCB layer 108 to make keyboard 100 more ruggedized and prevent damage from drops or rough use. In embodiments, safety layer 106 further creates a water-resistant layer. In an embodiment, silicone properties of safety layer 106 resists water ingress into the sensitive electronic PCB layer 108.

Figure 4:
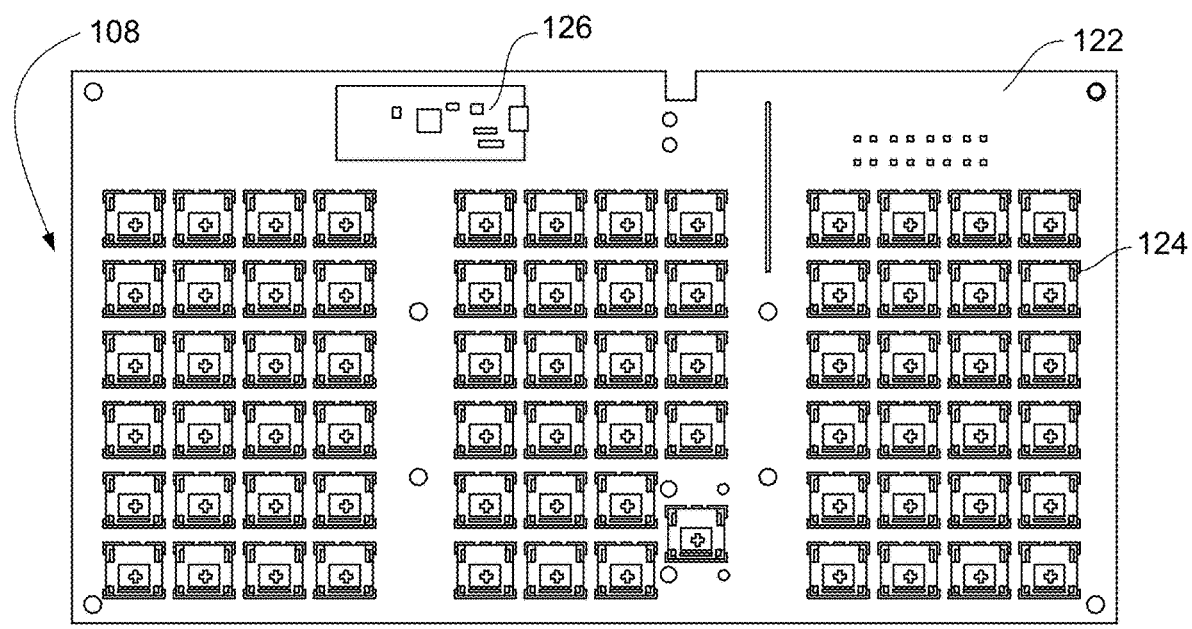
FIG. 4 is a top perspective view of a printed circuit board (PCB) of the universal keyboard of FIG. 1, according to an embodiment.
Figure 5:
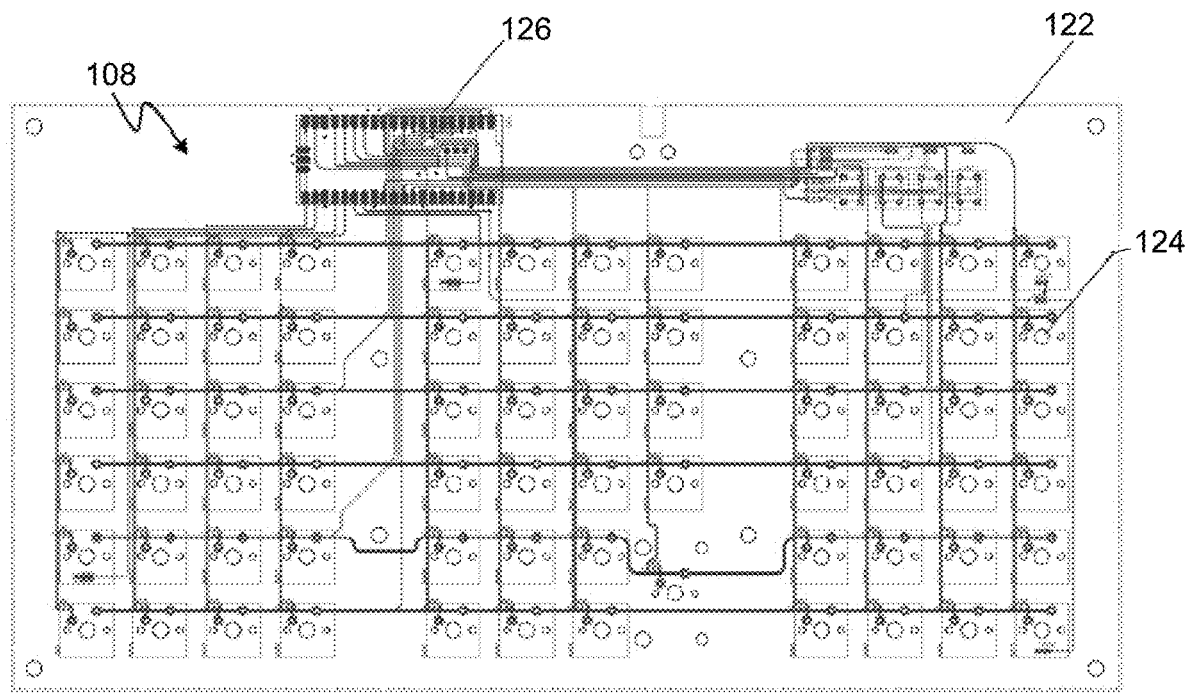
FIG. 5 is a logic diagram of the PCB of FIG. 4, according to an embodiment.

Referring to FIG. 4, a top perspective view of PCB layer 108 is depicted, according to an embodiment. Referring also to FIG. 5, a logic diagram of PCB layer 108 is depicted, according to an embodiment. PCB layer 108 generally includes a circuit board 122, a plurality of switches 124, and a processor 126. As depicted in FIG. 2B, PCB layer 108 further comprises a plurality of actuators 118.

Circuit board 122 comprises a substrate for electronics operably coupling plurality of switches 124, and processor 126, as well as plurality of actuators 118. Circuit board 122 includes mounting elements that allow coupling to the case formed by top shell portion 102 and bottom shell portion 104. In an embodiment circuit board 122 physically rests on internal support of bottom shell portion 104.

Processor 126 comprises any programmable device that accepts digital data as input, is configured to process the input according to instructions or algorithms, and provides results as outputs. In an embodiment, processor 126 is a Raspberry Pi PICO microcontroller board with a female micro USB-B integrated connector.

Processor 126 can include firmware code for the functionality described herein. In embodiments, the firmware is based on keyboard characters and function keys and special Unicode characters. Processor 126 can be integrated with new code via downloading.

In an embodiment, processor 126 incorporates firmware code configured to supply appropriate characters by a single key press, based on host system (e.g. WINDOWS, MAC, LINUX, UNIX, CHROME, etc.) selection. This provides compatibility for the user's environment and avoids having to obtain different equipment. Rather, the firmware handles different operating systems interpreting Unicode differently. A single keypress reduces the steps normally required for the Unicode and other key sequences, aiding the ability to enter these special characters.

For example, as noted herein, Unicode is a common, massive character set for all the world's languages, glyphs and emoji. The UTF encoding family is how computers know which sequence of bits should be represented as which character. However, every programming language, application, and OS implements and supports Unicode differently. Embodiments of the code integrated in processor 126 take into account these differences and format the respective key press for a particular operating system, and/or application, as needed.

Plurality of switches 124 comprises a set of electromechanical switches to receive key press input. In embodiments, plurality of switches 124 are relatively "clicky" switches allowing for increased sensory feedback from the keycap press. In an embodiment, plurality of switches 124 comprises electrical positions for mechanical MX style key switches. As depicted in FIG. 4, plurality of switches 124 comprises CHERRY BROWN but can be changed to accommodate desired tactile input.

Plurality of actuators 118 are positioned on the opposing side of circuit board 122 from plurality of switches 124 and processor 126. In an embodiment, plurality of actuators 118 comprises three mode switches for selection of a host operating system and one switch for uploading and reset functions.

Accordingly, plurality of actuators 118 can be activated by a user to mechanically switch between different operating systems depending on what type of host device keyboard 100 is plugged into. In other embodiments, keyboard 100 does not have actuators, but can automatically communicate with the host device to determine its operating system type. Input from plurality of actuators 118 (or other OS determination) is used such that within each OS, there exist a plurality of editors which may use the keyboard for entering characters and symbols. Since non-standard symbols for various editors within each OS may have different sequences required, the keyboard can be primarily written in Unicode for generalizability across OS and editors, with specialization for specific operating systems and editors. A specific editor such as GOOGLE Docs may not have the same keyboard codes required for one OS versus another and may require a different key sequence to be sent from keyboard 100 to the host device for a given keypress functionality.

In an embodiment, keyboard 100 does not have an internal power source; rather, the source of power is via the USB connection to host system. In an embodiment, the maximum mA required is 50 mA. In another embodiment, keyboard 100 can utilize wireless connections such as BLUETOOTH for communicatively coupling to host system, in which case keyboard can include a rechargeable battery or replaceable batteries. Alternatively, keyboard 100 can be wirelessly powered.

Figure 6:
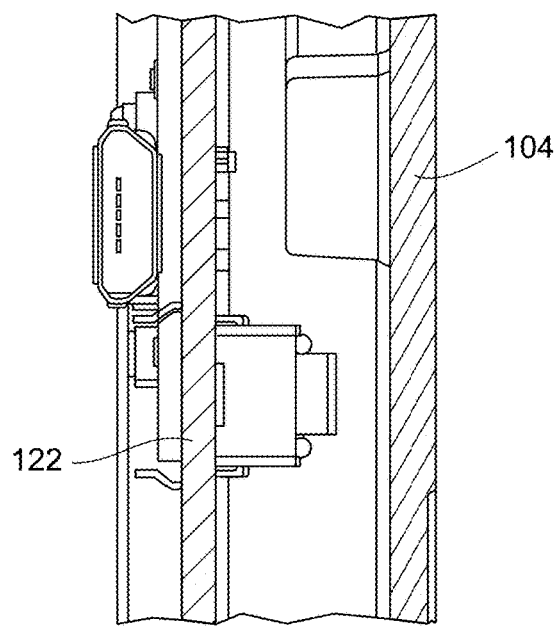
FIGS. 6-7 are partial side cross-sectional views of a universal keyboard, according to an embodiment.
Figure 7:
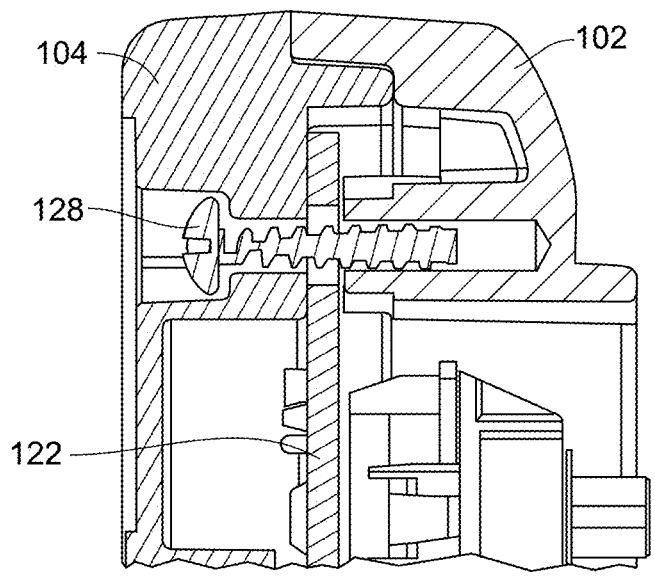

Referring to FIGS. 6-7, partial side cross-sectional views of universal keyboard 100 are depicted, according to an embodiment. As assembled, top shell portion 102 is operably coupled to bottom shell portion 104 and PCB layer (via circuit board 122) by fastener 128. As depicted, fastener 128 is a screw, but other types of fasteners can likewise be utilized. As will be readily understood, a plurality of such fasteners 128 can be utilized to secure various sections of keyboard 100. For example, top left, bottom left, top right, bottom right, and through the relative center of keyboard 100.

Figure 8A:
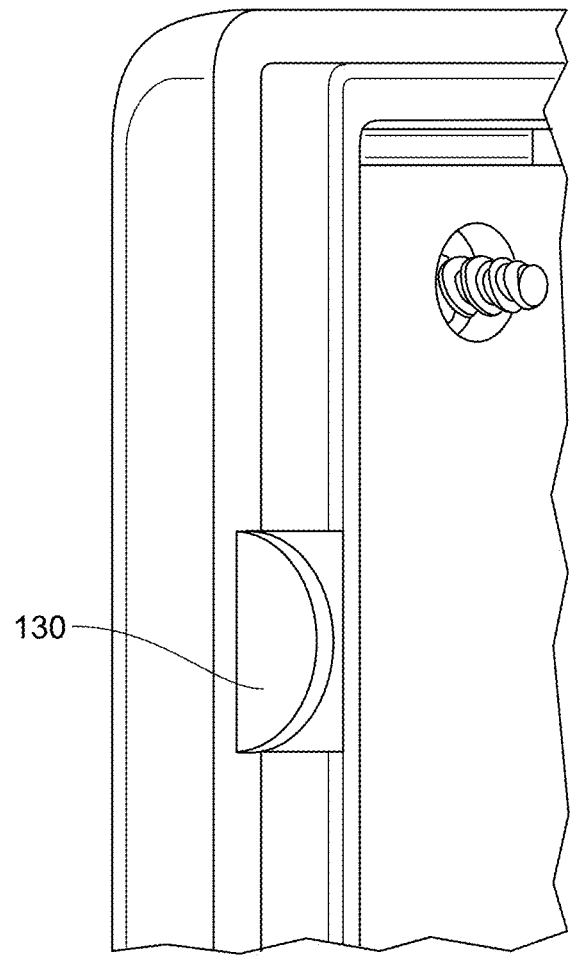
FIG. 8A is a partial side perspective view of a universal keyboard, according to an embodiment.

Referring to FIG. 8A, a partial side perspective view of universal keyboard 100 is depicted, according to an embodiment. In an embodiment, at least one of top shell portion 102 or bottom shell portion 104 can comprise a void for attachment of a magnetic component 130. Magnetic component 130 can be utilized to operably couple other keyboards to keyboard 100. For example, in an embodiment, keyboard 100 can include steel discs such that any attachment can contain a corresponding magnetic attachment or disc to physically couple keyboard 100 and the attachment.

More particularly, on the left and/or right sides of keyboard 100 are enclosed space holders for magnetic attachments that allow a magnetic attachment to supplemental keyboards using corresponding magnetic attachments. For example, in an embodiment, each side of keyboard 100 can comprise three steel discs. Additional supplementary keyboards can be attached to the right and/or left sides of the keyboard 100 using the magnetic attachment. In other embodiments, supplemental keyboards can otherwise operably couple to keyboard 100 using any suitable fastener.

In embodiments, one or more supplemental keyboards can physically couple to primary keyboard 100 but also electrically couple to the host system using its own electrical coupling (wired, wireless). Accordingly, a supplemental keyboard can comprise a separate processor. In other embodiments, a supplemental keyboard can be communicatively coupled to primary keyboard 100, such as by wired or wireless connection such that inputs from the supplemental keyboard can be relayed through primary keyboard 100 or separately communicate with the computing device.

Accordingly, a series of smaller add-on units with corded, magnetic, hot pluggable or wireless attachments to each other can be assembled as a system, with one unit or a plurality of units (e.g. 10 units) for the advanced user. Additional dedicated keyboards can be for a dedicated calculus attachment, a dedicated set theory symbol attachment, a dedicated full Greek alphabet attachment, a dedicated analog and digital transform symbol attachment, and a dedicated engineering symbol attachment.

Figure 8B:
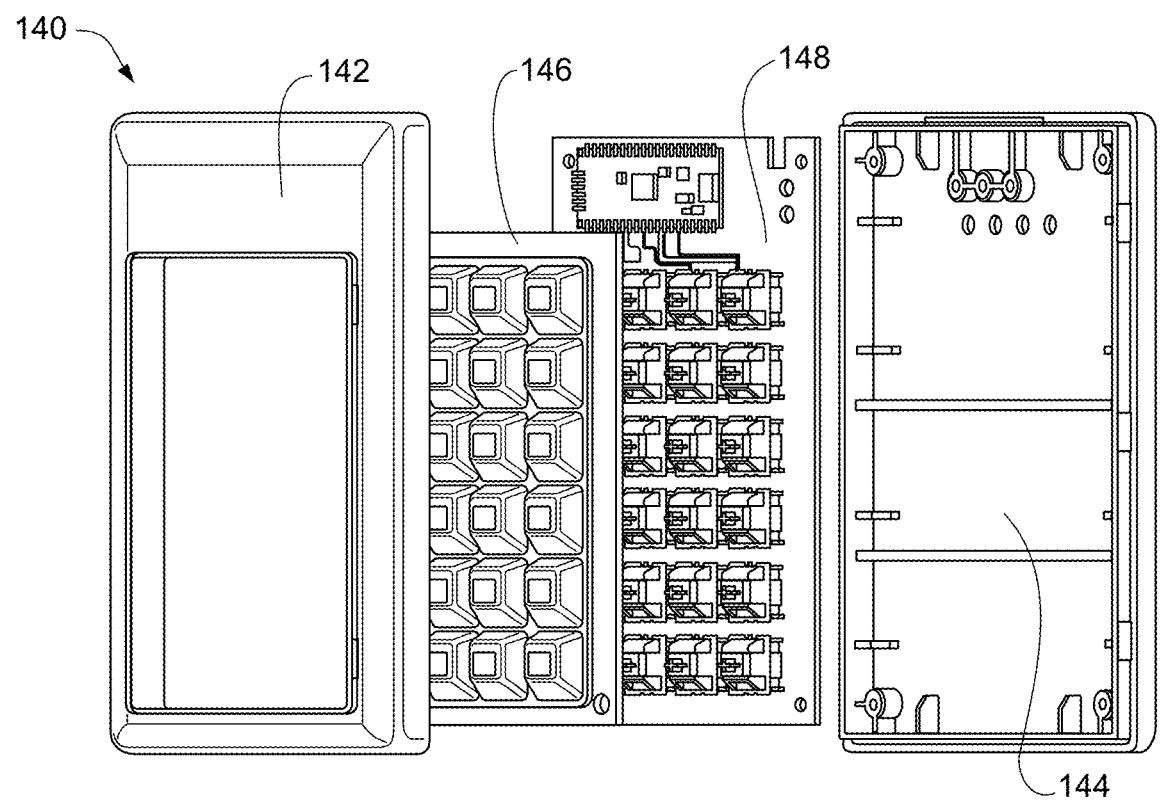
FIG. 8B is an exploded view of a supplemental keyboard, according to an embodiment.

For example, referring to FIG. 8B, an exploded view of a supplemental keyboard 140 is depicted, according to an embodiment. Supplemental keyboard 140 itself comprises a top shell portion 142, a bottom shell portion 144, a safety layer 146, and a PCB layer 148. One of ordinary skill in the art will appreciate that top shell portion 142, bottom shell portion 144, safety layer 146, and PCB layer 148 are substantially similar to top shell portion 102, bottom shell portion 104, safety layer 106, and PCB layer 108, respectively, aside from their proportionally smaller size. Supplemental keyboard 140 can include magnetic attachments corresponding to magnetic component 130 in keyboard 100 for operable coupling.

Figure 8C1:
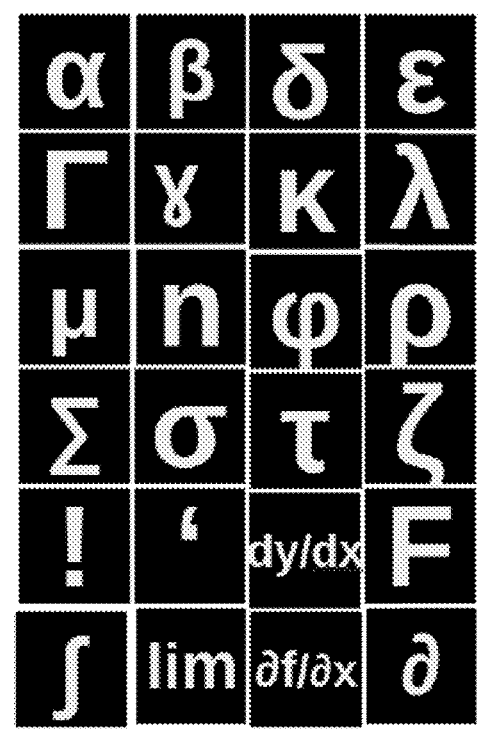

Referring to FIG. 8C1, a block diagram of keycap layout of supplemental keyboard 140 is depicted, according to an embodiment. As illustrated, supplemental keyboard 140 comprises a "calculus" keyboard including a plurality of symbols corresponding to respective keys, the symbols commonly used in calculus operations. Referring to FIG. 8C2, a block diagram of another keycap layout of supplemental keyboard 140 is depicted, according to another embodiment.

Figure 8D:
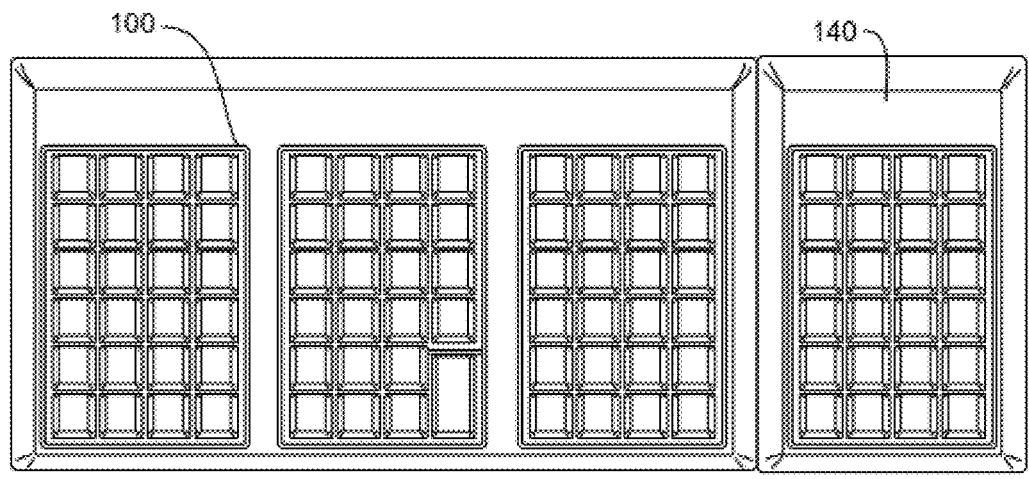
FIG. 8D is a top view of a universal keyboard coupled to a supplemental keyboard, according to an embodiment.
Figure 8E:
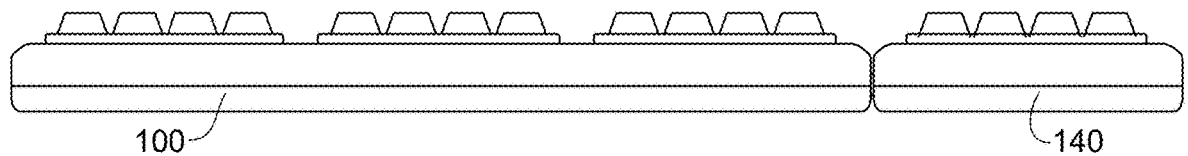
FIG. 8E is a side view of the universal keyboard coupled to the supplemental keyboard of FIG. 8D, according to an embodiment.

As coupled, referring to FIG. 8D, a top view of universal keyboard 100 coupled to supplemental keyboard 140 is depicted according to an embodiment. Referring to FIG. 8E, a side view of universal keyboard 100 coupled to the supplemental keyboard 140 is depicted, according to an embodiment.

Referring again to FIG. 1, when assembled, top shell portion 102 allows for keycaps 101 to be visible through plurality of apertures 110. In an embodiment, keycaps 101 are visible in the three sections of top shell portion 102 as follows: left and right sections having six rows and four columns with 24 keys each. Center section: 6 rows and 4 columns with 23 keys due to a larger Enter key comprising the space of 2 standard keys. The smaller keycaps are 1×1, standard MX R3 style key caps and the larger keycap is 1×2 standard MX R3 style. The keycaps of varying groups are colored to help orient the user to related key functions, such as trigonometry words in green, arrow keys and select in blue, GOOGLE Docs Equation Editor only keycaps in purple, common keyboard functions in yellow, and the remaining keys in black. Printed legends on the keycaps are white, yellow, or black. The colors of the keycaps and text can be changed if desired. In an embodiment, certain keycaps have a window for LED backlight when the keycap is pushed (select, $2^{nd}$, and Caps lock, in an embodiment). Keycaps 101 can be labeled either with keyboard stickers, permanent printing, or double-shot keycaps. Although depicted with uniform sections, embodiments can have more or fewer keys or keycaps, and differ by section.

The physically separate three sections created by apertures 110 and the corresponding keycaps allow for both visual separation as well as the ability to fasten covers (as will be described) to help users focus on fewer keys. Users can also rest their hand on the cover to type in a nearby section for increased stability if weakness or control is an issue.

Figure 9A:
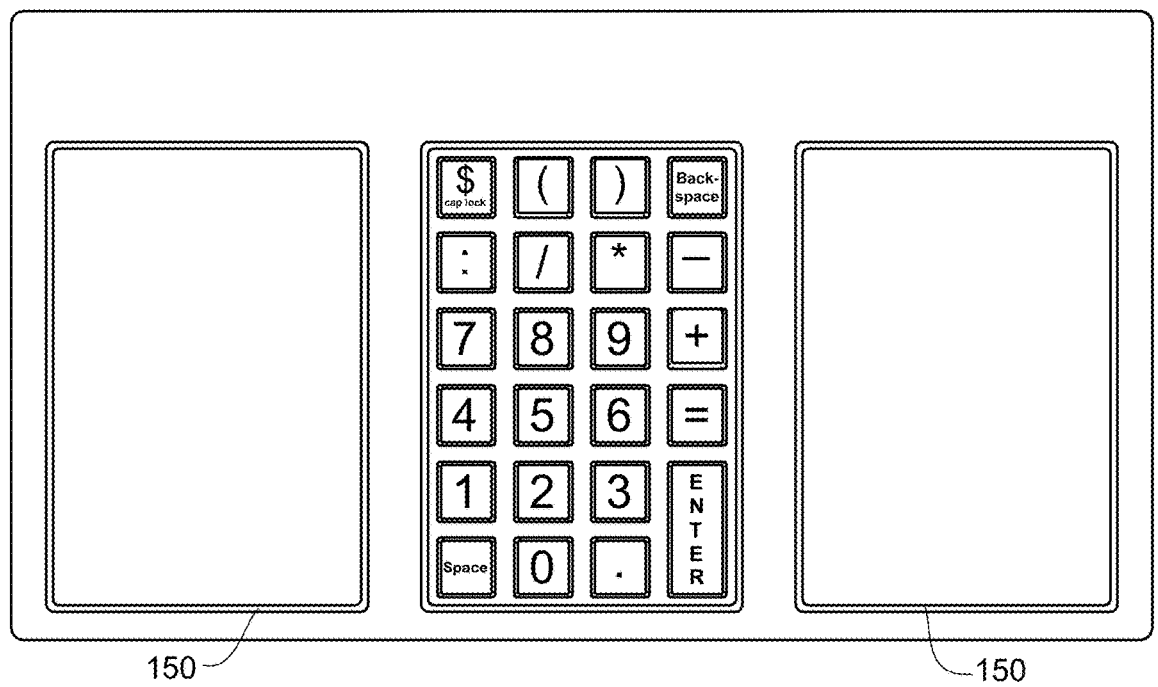
FIG. 9A is a top perspective view of a universal keyboard partially covered with section covers, according to an embodiment.

Referring to FIG. 9A, a top perspective view of a universal keyboard partially covered with section covers 150 is depicted, according to an embodiment. Section covers 150 are partial boxes configured to cover one or more sections of keyboard 100.

Accordingly, section covers 150 can make a friction fit with top shell portion 102 and/or keycaps 101 to be operably coupled to keyboard 100. In an embodiment, section covers 150 are substantially the same or slightly larger than the combined size of keycaps 101 for the section. In an embodiment, section covers horizontally are approximately 3.25 inches wide and 4.75 inches tall, and vertically are 0.5 inches tall corresponding to the 4×6 array of keycaps 101 in a single section. Section covers 150 can be 3D or injection molded plastic, laser-cut polycarbonate, or other suitable material. Accordingly, in an embodiment, section covers 150 are a rugged plastic shell designed to enclose any of the three sections on keyboard 100.

Referring to FIGS. 9B1-9B2, top perspective views of a keyguard 160 for a universal keyboard is depicted, according to an embodiment. In an embodiment, FIG. 9B1 depicts a keyguard for a universal keyboard without keycaps, and FIG. 9B2 depicts a keyguard for a universal keyboard with keycaps. Keyguard 160 comprises a section interface 162 and grid 164 creating a plurality of spaces 166 for individual keycaps 101. Plurality of spaces 166 allows for keycaps 101 to be visible through grid 164. Keyguard 160 is accordingly configured to cover one or more sections of keyboard 100 and prevent users from pushing more than one key at a time by mechanically blocking adjacent keycaps. Keyguard 160 can be 3D or injection molded plastic or other suitable material.

More particularly, keyguard 160 can make a friction fit with top shell portion 102 to be operably coupled to keyboard 100. In certain embodiments, section interface 162 and grid 164, respectively, sit slightly below and project slightly above the top of keycaps 101 when coupled to keyboard 100. In other embodiments, section interface 162 and grid 164, respectively, sit slightly below and are flush with the top of keycaps 101. Accordingly, keyguard 160 is configured to allow access to keycaps 101 themselves, but also to help avoid neighboring keys to be inadvertently activated.

Figure 9C:
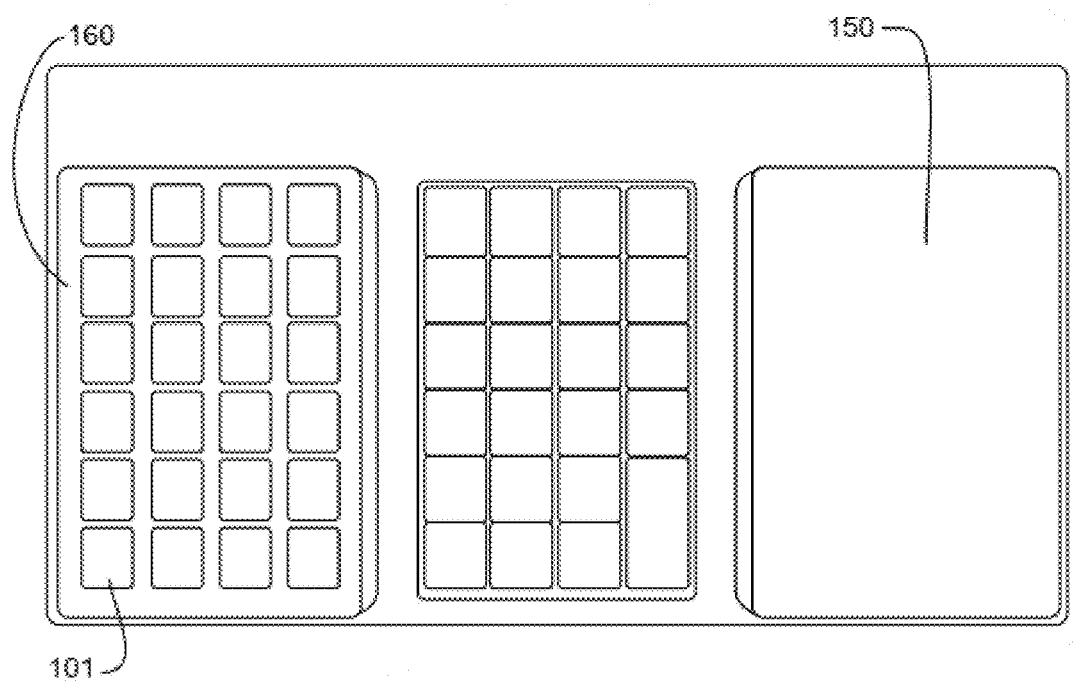
FIG. 9C is a top perspective view of a universal keyboard with a keyguard and a section cover, according to an embodiment.

Referring also to FIG. 9C, a top perspective view of a universal keyboard with a keyguard 160 and a section cover 150 is depicted, according to an embodiment. Keyguard 160 and section cover 150 can be used alone, or combined, depending on the end user's needs and abilities.

Figure 10A:
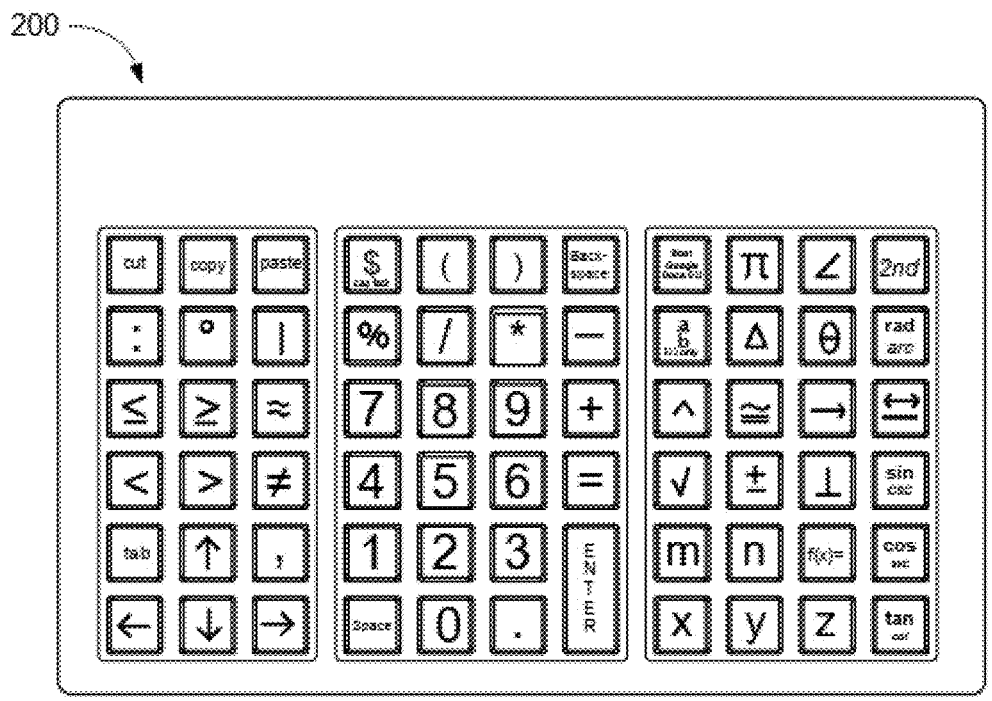
FIG. 10A is a top perspective view of another universal keyboard, according to an embodiment.

Referring to FIG. 10A, a top perspective view of another universal keyboard 200 is depicted, according to an embodiment. Keyboard 200 is substantially similar to keyboard 100, except the left section comprises keycaps of 3×6, and the center and right sections comprise keycaps of 4×6 as in keyboard 100.

Figure 10B:
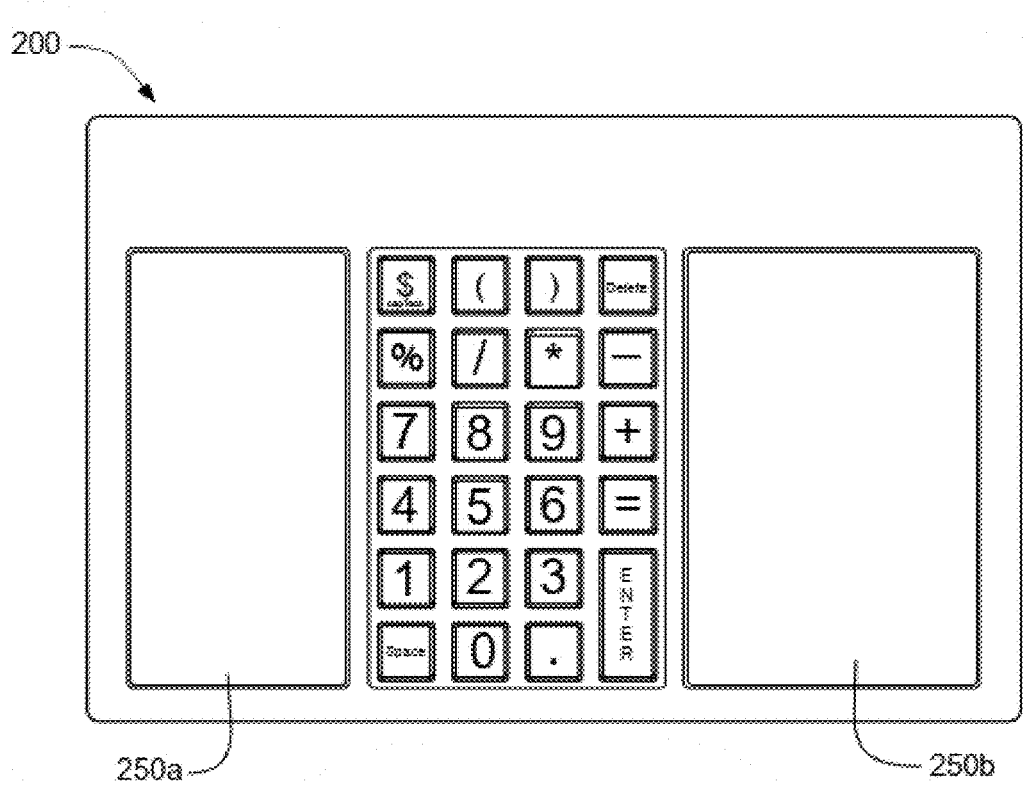
FIG. 10B is a top perspective view of the universal keyboard of FIG. 10A partially covered with section covers, according to an embodiment.

Referring to FIG. 10B, a top perspective view of universal keyboard 200 is depicted as partially covered with section covers 250a and 250b, according to an embodiment. Section covers 250a and 250b are substantially similar to section cover 150. However, as depicted, section cover 250a is smaller than section cover 250b to reflect the smaller section of 3×6 keycaps.

Figure 10C:
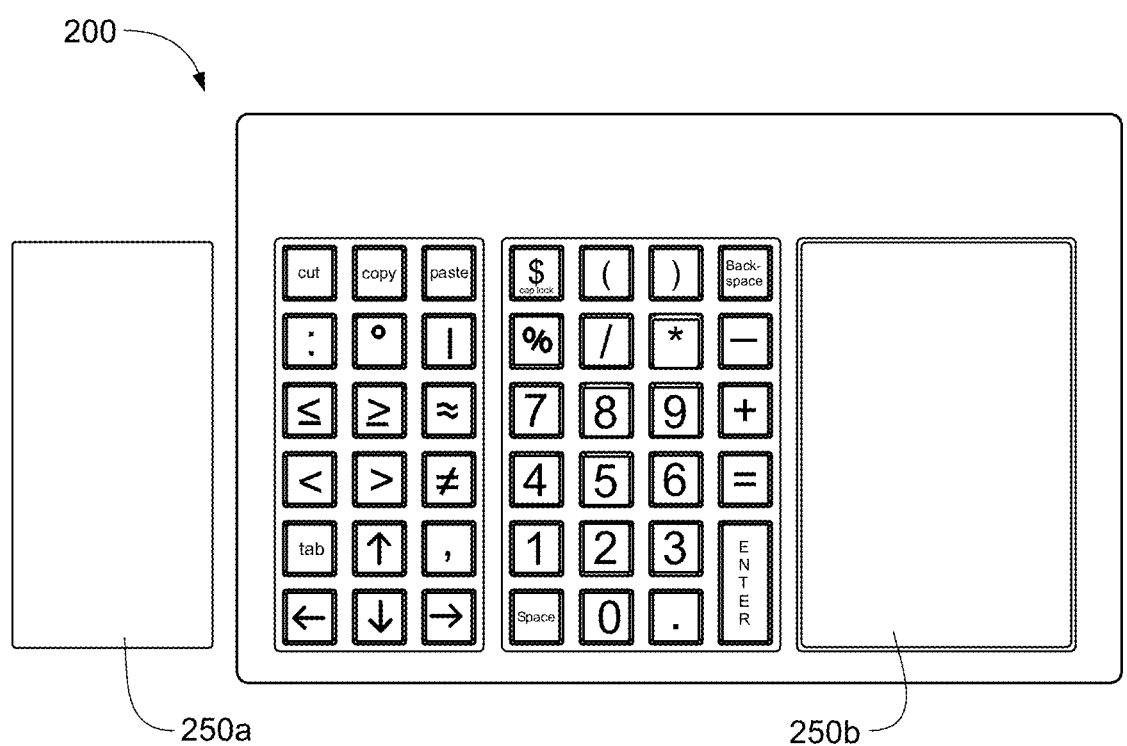
FIG. 10C is a top perspective view of the universal keyboard of FIG. 10A partially covered with a section cover, according to an embodiment.

Referring to FIG. 10C, a top perspective view of universal keyboard 200 is depicted as partially covered with section cover 250b and with section cover 250a removed, according to an embodiment.

Figure 10D:
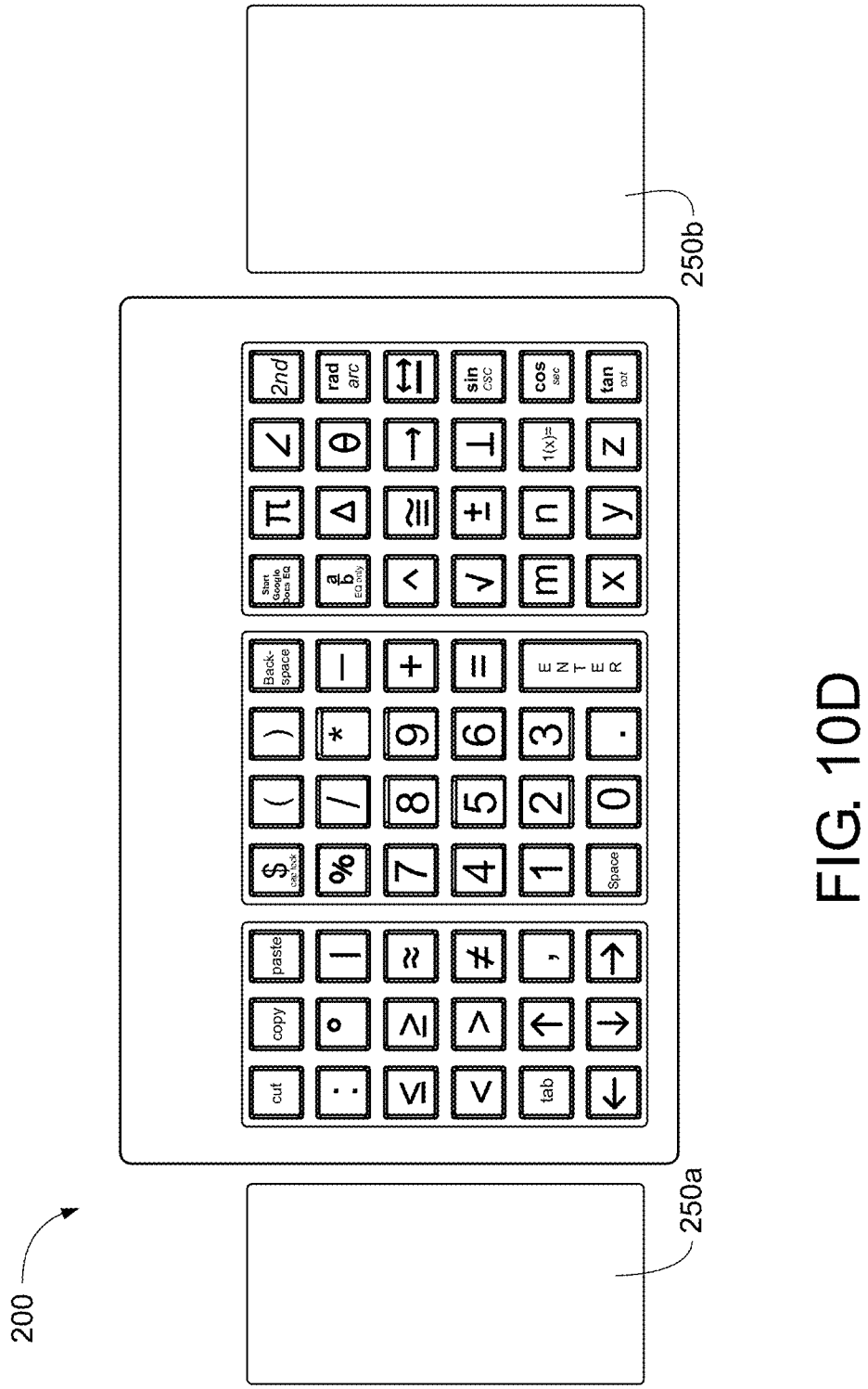
FIG. 10D is a top perspective view of the universal keyboard of FIG. 10A depicted without section covers, according to an embodiment.

Referring to FIG. 10D, a top perspective view of universal keyboard 200 is depicted with section covers 250a and 250b both removed, according to an embodiment.

Figure 11A:
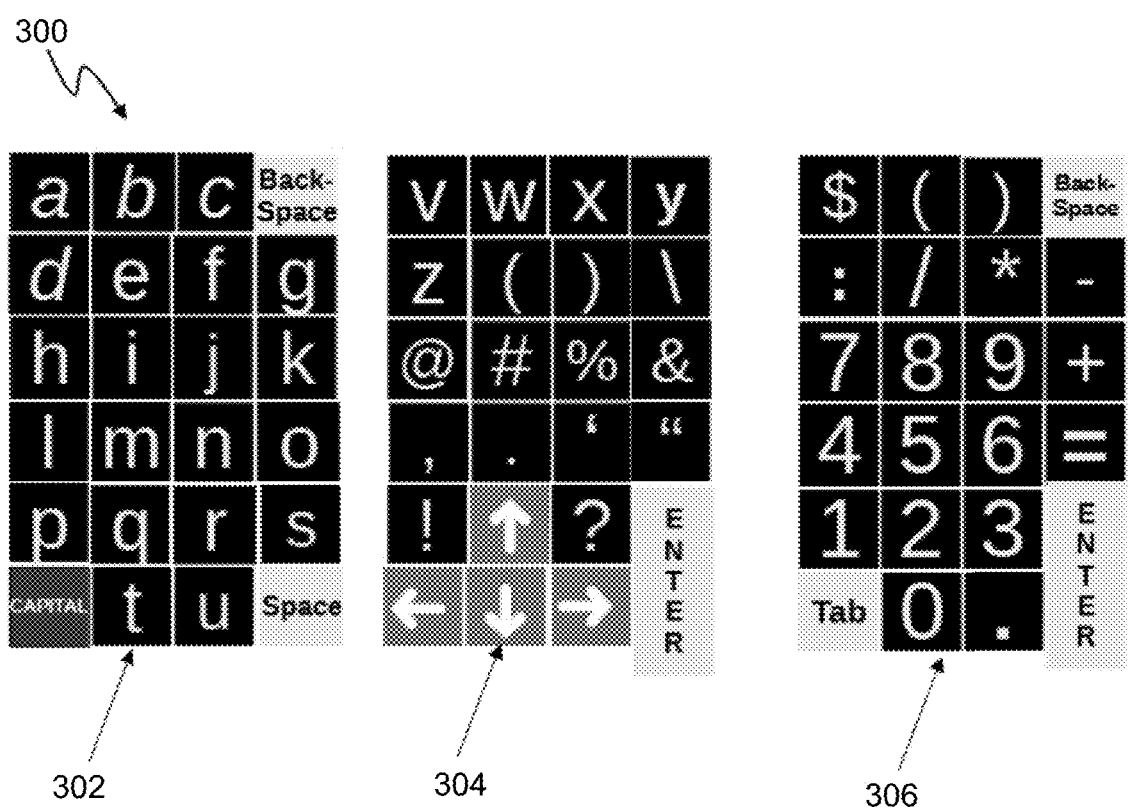
FIG. 11A is a block diagram of a letter keyboard with number pad, according to an embodiment.

Referring to FIG. 11A, a block diagram of a letter keyboard 300 is depicted, according to an embodiment. Similar to keyboard 100, keyboard 300 comprises three sections with keys grouped according to a logical arrangement.

Specifically, a first section 302 comprises a plurality of letters and basic keyboard functions, a second section 304 comprises the remaining letters in the English alphabet and commonly used alphabet-related symbols, and a third section 306 comprises numbers and commonly used number-associated symbols. Each of the three sections 302, 304, 306 can be selectively covered with section covers or guarded with keyguards.

Figure 11B:
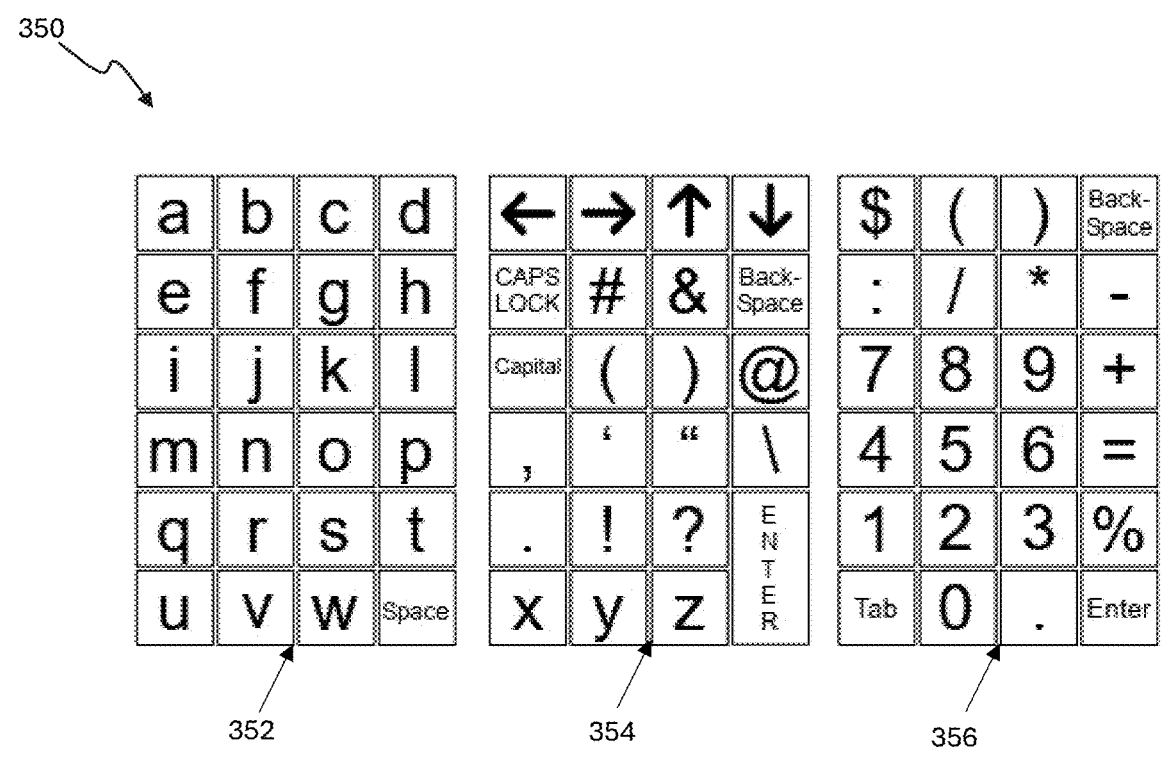

Referring to FIG. 11B, a block diagram of another letter keyboard 350 is depicted, according to an embodiment. Keyboard 350 comprises three sections 352, 354, 356 with keys grouped according to another logical arrangement.

Specifically, a first section 352 comprises a plurality of letters and a space key, a second section 354 comprises the remaining letters and commonly used alphabet-related symbols, and a third section 356 comprises numbers and commonly used number-associated symbols. Each of the three sections 352, 354, 356 can be selectively covered with section covers or guarded with keyguards.

Figure 12:
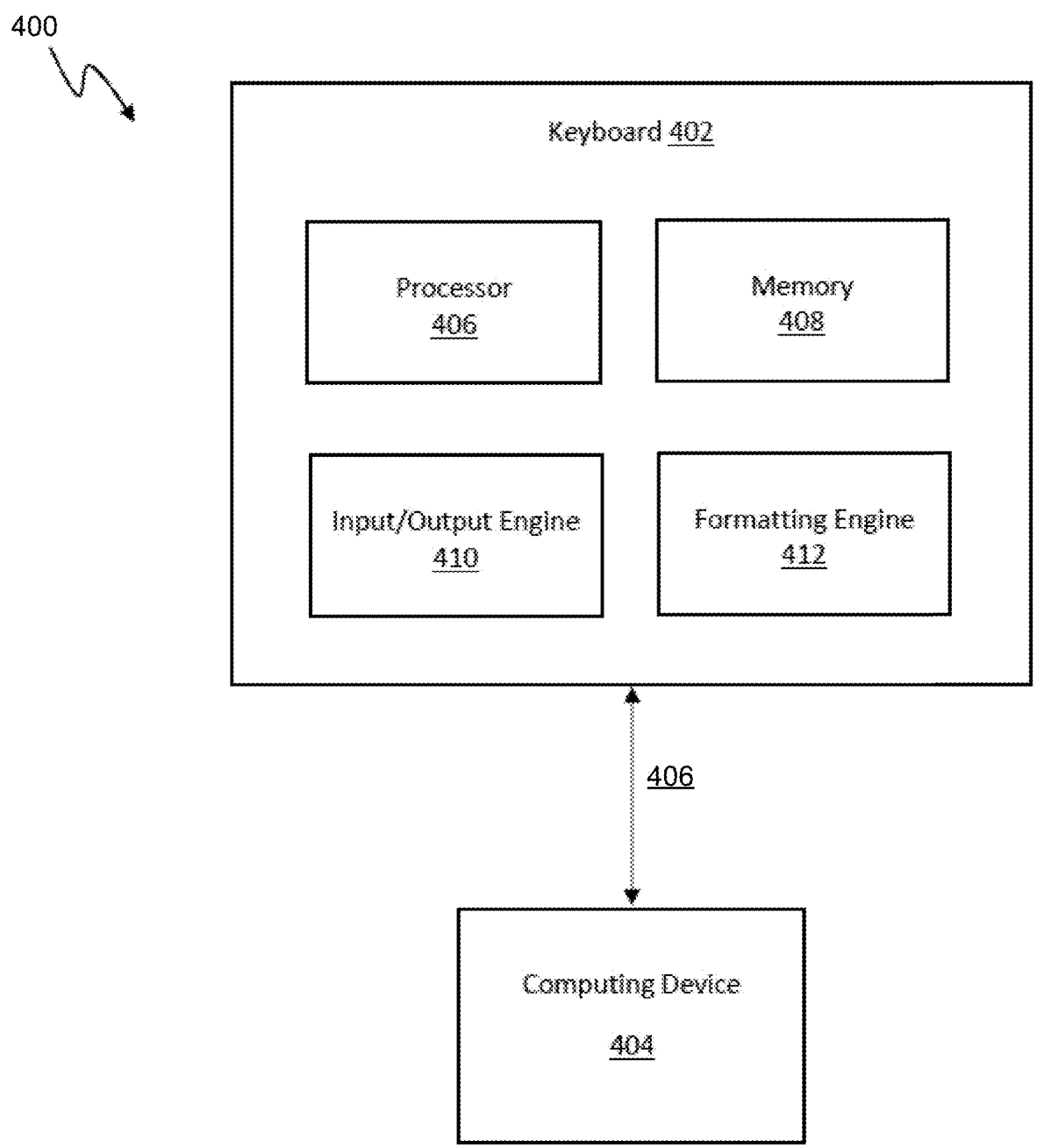
FIG. 12 is a block diagram of a universal keyboard system, according to an embodiment.

Referring to FIG. 12, a block diagram of a universal keyboard system 400 for universal notation is depicted, according to an embodiment. System 400 generally comprises a keyboard 402 and computing device 404.

The system includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

According to an embodiment, the engine components of keyboard 402 can be located relatively within keyboard 402, in a singular "cloud" or network, or spread among many clouds or networks. End-user knowledge of the physical location and configuration of components of keyboard 402 is not required.

Keyboard 402 generally includes processor 406, an operably coupled memory 408, an input/output engine 410, and a formatting engine 412.

Processor 406 can be any programmable device that accepts digital data as input, is configured to process the input according to instructions or algorithms, and provides results as outputs. In an embodiment, processor 406 can be a central processing unit (CPU) configured to carry out the instructions of a computer program. Processor 406 is therefore configured to perform at least basic arithmetical, logical, and input/output operations.

Memory 408 can comprise volatile or non-volatile memory as required by the coupled processor 406 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Input/output engine 410 is configured to receive input of one or more key presses via switches 124. Input/output engine 410 is further configured to output a formatted key press input to computing device 404 after formatting by formatting engine 412. Input/output engine 410 is therefore configured to transmit a tailored packet to computing device 404.

Formatting engine 412 is configured to format the input from plurality of switches 124 for a specific operating system, application, or other criteria. In particular, formatting engine 412 can utilize data from computing device 404 and/or plurality of actuators 118 to determine an operating system of computing device 404.

For example, a host system (e.g. computing device 404) running MACOS, LINUX/CHROME, or WINDOWS is very specific about how characters are to be sent. In an embodiment, formatting engine 412 prepares the appropriate format based on the keymap input of keyboard 402, along with a proper OS system selection. The data packets for WINDOWS, for example, are a wholly different format from MacOS or Linux, and would cause the latter two to be very confused about what was being presented for it to interpret. In other embodiments, other data criteria are utilized to format the output for computing device 404 (e.g. application type) to generate a packet tailored for the specific criteria.

Accordingly, formatting engine 412 receives a key press input from input/output engine 410 and formats the key press input into a formatted key press input based on one or more criteria like operating system, and sends the formatted key press input back to input/output engine 410 for transmission to computing device 404.

Computing device 404 is otherwise known as a host system and contains the operating system and applications for which keyboard 402 can provide symbol input. For example, computing device 404 can be a desktop computer, laptop computer, tablet, mobile computing device, server, workstation, Internet-of-things device, assistive portable device, or other computing device.

In embodiments, keyboard 402 is operably coupled to computing device 404 via one or more communication channels 406. Communication channel 406 can be wired or wireless and be implemented according to any suitable protocol, such as USB, BLUETOOTH, Internet Protocol (IP), Wi-Fi, or any other appropriate format for the respective electrical and/or data connection.

In operation, keyboard 402 interacts with the computing device 404 via communication channel 406, such as USB HID (Human Interface Device) functionality. These protocols are compatible among the major hardware and operating systems environments such as WINDOWS, MAC and LINUX based systems. However, such systems interpret the Unicode sequences differently. As described herein, the inclusion of user selectable OS modes (or automatic detection, as described herein) allows users to choose an environment for which keyboard 402 input can be tailored to be sent to computing device 404.

When a switch is active as received by input/output engine 410, processor 406 recognizes what switch, or combination of switches, is active, and generates the corresponding data packet representing the selected characters information to be sent to computing device 404. The formatting requirements for those data packets are tailored to each host system by the mode selection through formatting engine 412 and sent to computing device 404 by input/output engine 410 over communication channel 406. When the data packet is received by computing device 404, its operating system interprets the data and places it on the screen as an appropriately selected character in the user's document.

Figure 13:
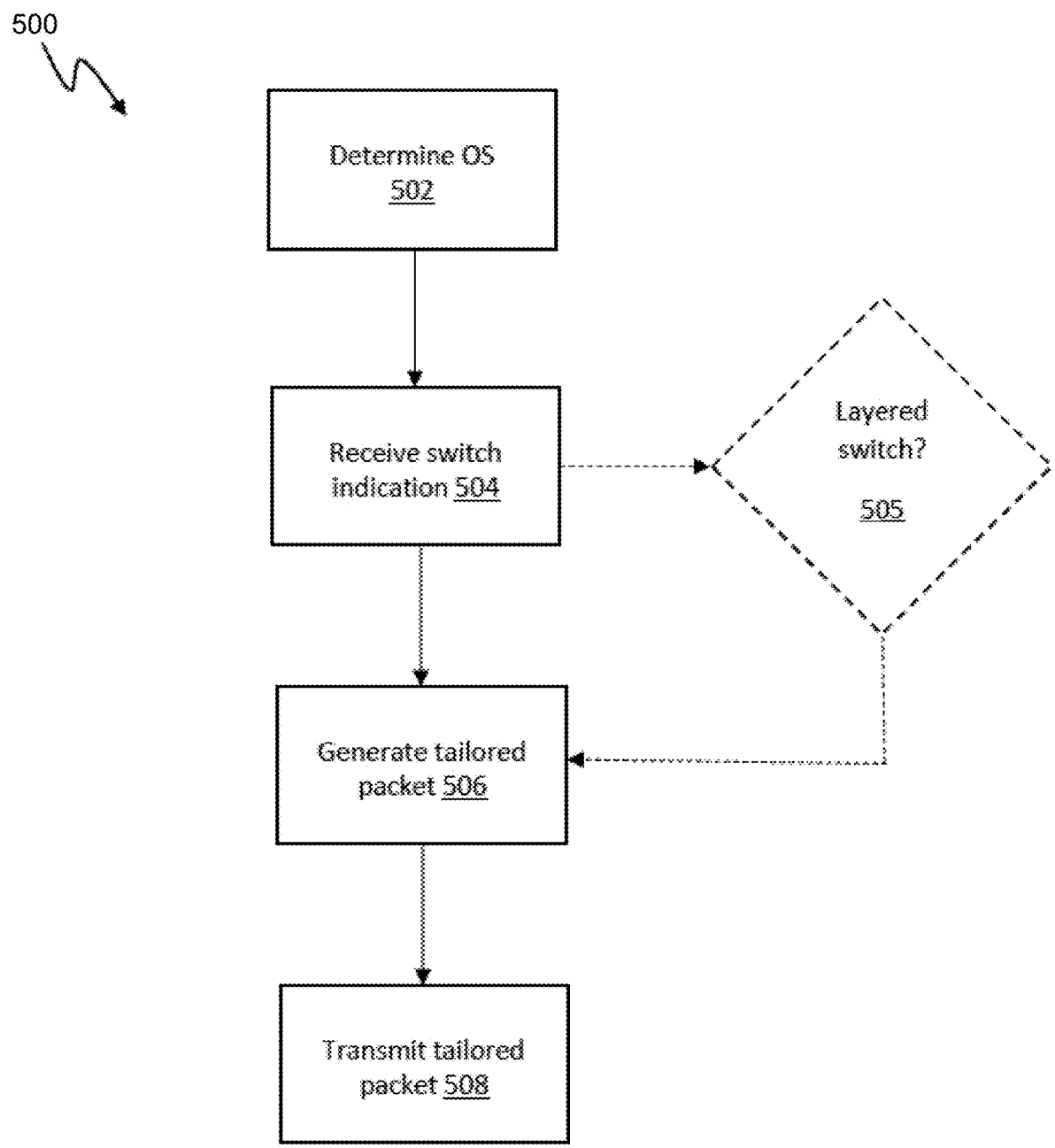
FIGS. 13-14 are flowcharts of methods for operating a universal keyboard system, according to embodiments.
Figure 14:
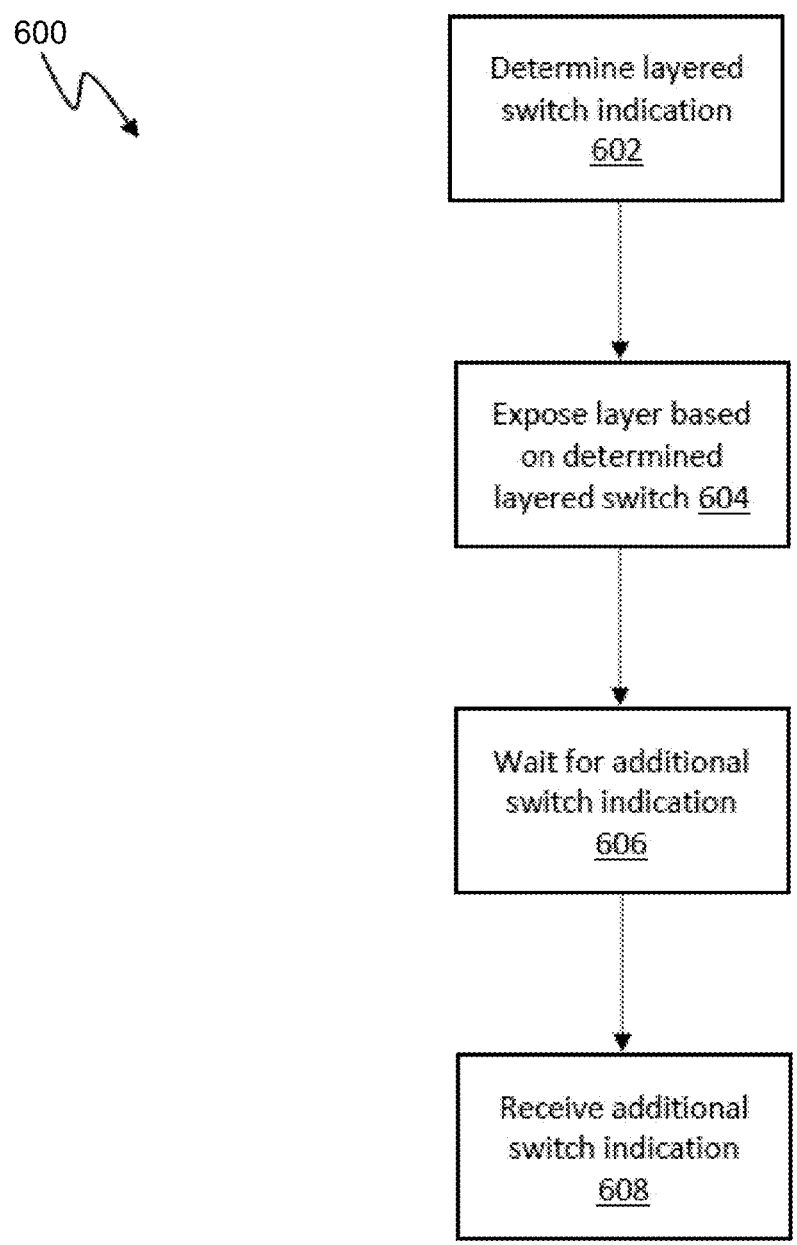

Referring to FIGS. 13, a flowchart of a method 500 for operating a universal keyboard system are depicted, according to embodiments. In embodiments, method 500 can be utilized for any of the keyboards and systems described herein, such as keyboard 100, 200, 300, and/or system 400.

At 502, an operating system is determined. For example, referring again to FIG. 12, formatting engine 412 can utilize plurality of actuators 118 to determine an operating system.

In embodiments, the operating system at 502 can be detected at initialization of keyboard 402 and stored in memory 408 for use for subsequent formatting. In other embodiments, the operating system at 502 can be detected at every formatting operation (or generation of tailored packet 506, as will be described). In other embodiments, the operating system at 502 can be detected periodically throughout use of keyboard 402.

At 504, a switch indication is received. For example, input/output engine 410 receives input of one or more key presses via switches 124.

At 506, a tailored packet is generated. For example, formatting engine 412 receives a switch indication from input/output engine 410 and formats the switch indication into a formatted key press input based the operating system determined at 502 as a tailored packet for specific criteria (e.g. operating system).

At 508, a tailored packet is transmitted. For example, input/output engine 410 receives the tailored packet from formatting engine 412. Input/output engine 410 transmits the tailored packet to computing device 404 over communication channel 406.

At 505, referring also to FIG. 13, a further method 600 for operating a universal keyboard system is depicted. At 505, a check of whether the switch indication from input/output engine 410 is a layered switch is conducted.

At 602, method 600 determines that a layered switch has been indicated. For example, input/output engine 410 can determine a layered switch has been input.

At 604, a virtual layer is exposed based on the determined layered switch indication. For example, input/output engine 410 can expose a second layer from the first layer for subsequent input by a user.

At 606, method 600 waits for an additional switch indication. For example, input/output engine 410 can wait in a holding state for an additional switch input.

At 608, an additional switch indication is received. For example, input/output engine 410 can receive an additional switch indication from switches 124. In an embodiment, method 600 can be iterated to determine if additional switch indication is itself a layered switch indication. From 608, method 600 can return to FIG. 13 and generate a tailored packet at 506 based on the layered switch inputs.

Virtual layers therefore allow for easy input of additional characters or functionality. For example, virtual layers allow users to select text through the push of one button at a time. In an embodiment, a layered input (e.g. $2^{ND}$ key or SELECT key) is input, and is illuminated. Subsequent individual inputs of one or more arrow keys can be utilized to select text, instead of holding multiple keys or mouse clicks as in traditional systems. Moreover, the selected text can be selected, cut, copied, and pasted using operations in a tailored packet specific to a particular operating system.

Figure 15A:
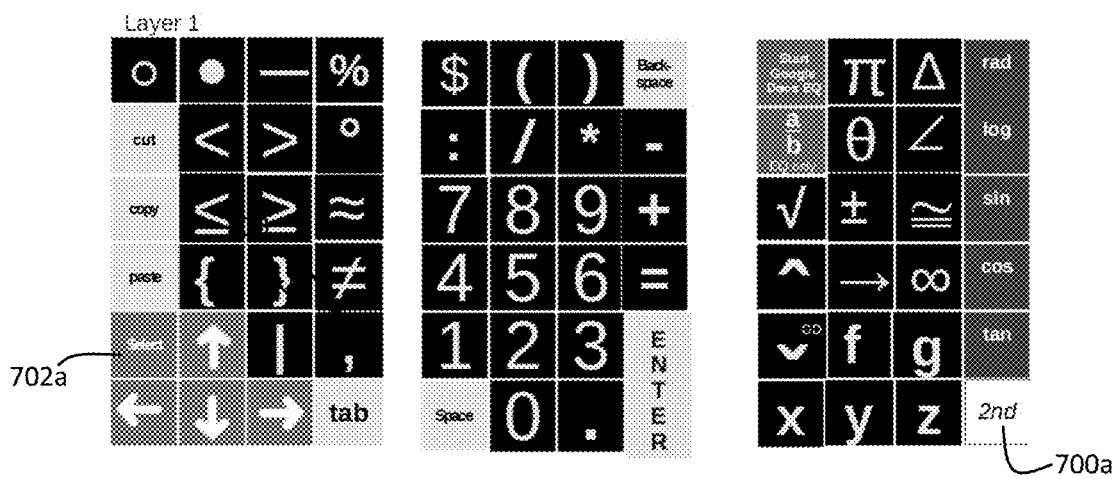
FIGS. 15A-15C are block diagrams of virtual layers of a universal keyboard, according to an embodiment.
Figure 15B:
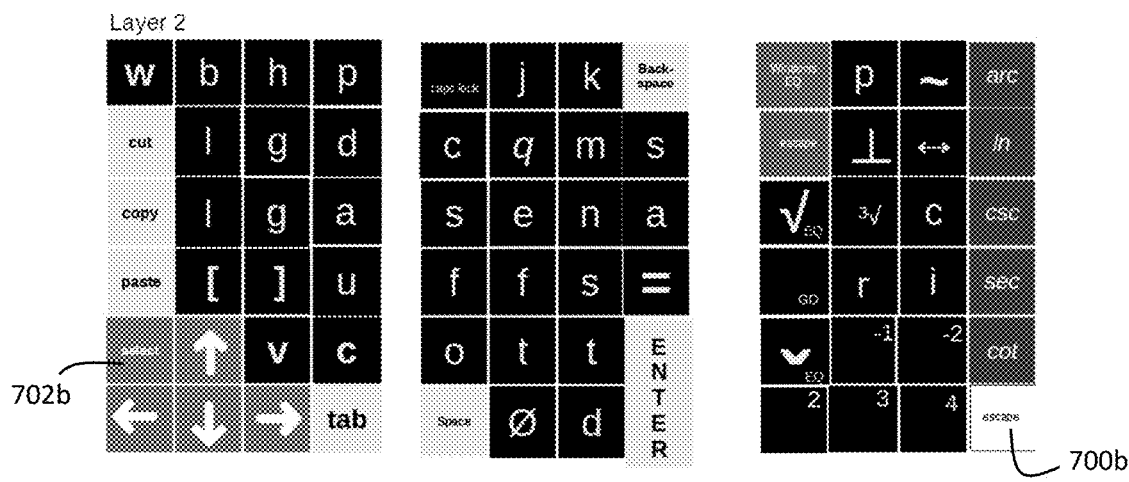
Figure 15C:
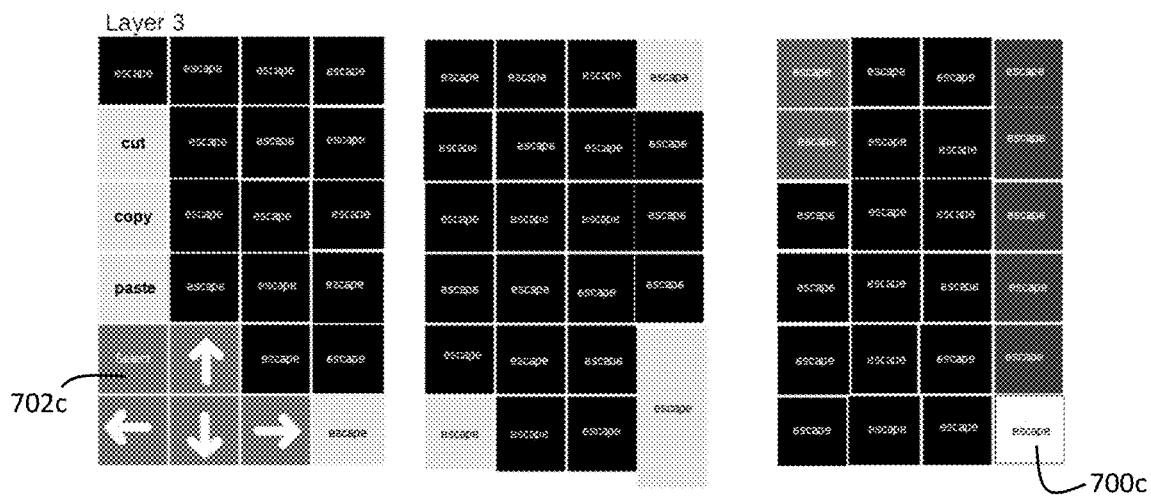

In an embodiment, referring to FIGS. 15A-15C, block diagrams of virtual layers of a universal keyboard are depicted, according to an embodiment. FIG. 15A depicts a first layer, FIG. 15B depicts a second layer, and FIG. 15C depicts a third layer.

For example, FIG. 15A depicts the input for the larger central characters on the keycaps representing a first keypress that will be input to computing device.

If a second layer (e.g pressing the $2^{ND}$ key 700a) is exposed, FIG. 15B depicts the input from a subsequent key press. In another embodiment (though not depicted), a different virtual layer activation key can activate or expose the second layer. In an embodiment, the input to the computing device is the second smaller character which is pictured at the lower part of the keycap (if present). If no second character is listed on the key, then the key will display the first letter of the character listed (i.e. pi becomes p, infinity becomes i, etc). The exceptions to that rule is that (and) are displayed on the second layer as j and k, respectively, symbolizing join and keep together. Therefore, the entire alphabet is coded into the first (f, g, x, y, z) or second layers (remainder of the alphabet). In an embodiment, a majority of the second layer keys have a common association, such as being lowercase letters. Accordingly, typing letters, such as for algebraic variables, is more convenient than reaching back to the computer keyboards. Escape at 700*b* means nothing happens when the key is pressed and the layer reverts back to the first layer.

In an embodiment, a third layer can be exposed. FIG. 15C depicts input to allow selection of text to cut or copy and then paste. Pushing the select button 702*b* activates the third layer on which only the arrow keys and cut, copy, and paste function are available. Pressing any other key will revert back to the first layer. For example, previous $2^{ND}$ key is again escape 700*c* in the third layer. A single press of the select button 702*b* simulates holding the shift key on a traditional keyboard to then push the direction arrows to select text. The text will then be highlighted to be cut or copied, and then the user will use the cursor to paste the text to the desired area on the screen. In an embodiment, a majority of the third layer keys have a common association, such as being escape keys. In another embodiment, a majority of active (non-escape keys) have a common association, such as arrows and cut-copy-paste for selection of an object (e.g. text, image) and subsequent cut, copy, or paste.

Figure 16A:
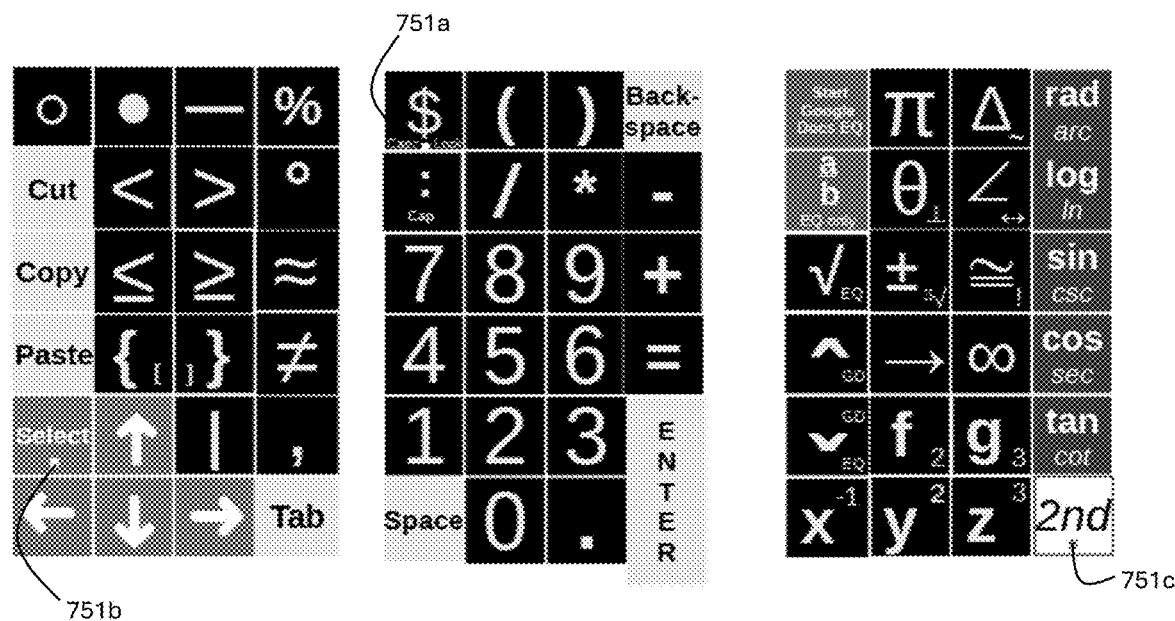
FIG. 16A is a block diagram of a universal keyboard, according to an embodiment.

In an embodiment, referring to FIG. 16A, a block diagram of a universal keyboard is depicted, according to an embodiment. FIG. 16A depicts windows for LED backlighting when the keycap is pushed, including Caps lock 751*a*, Select 751*b*, and $2^{ND}$ 751*c*, in an embodiment).

Figure 16B:
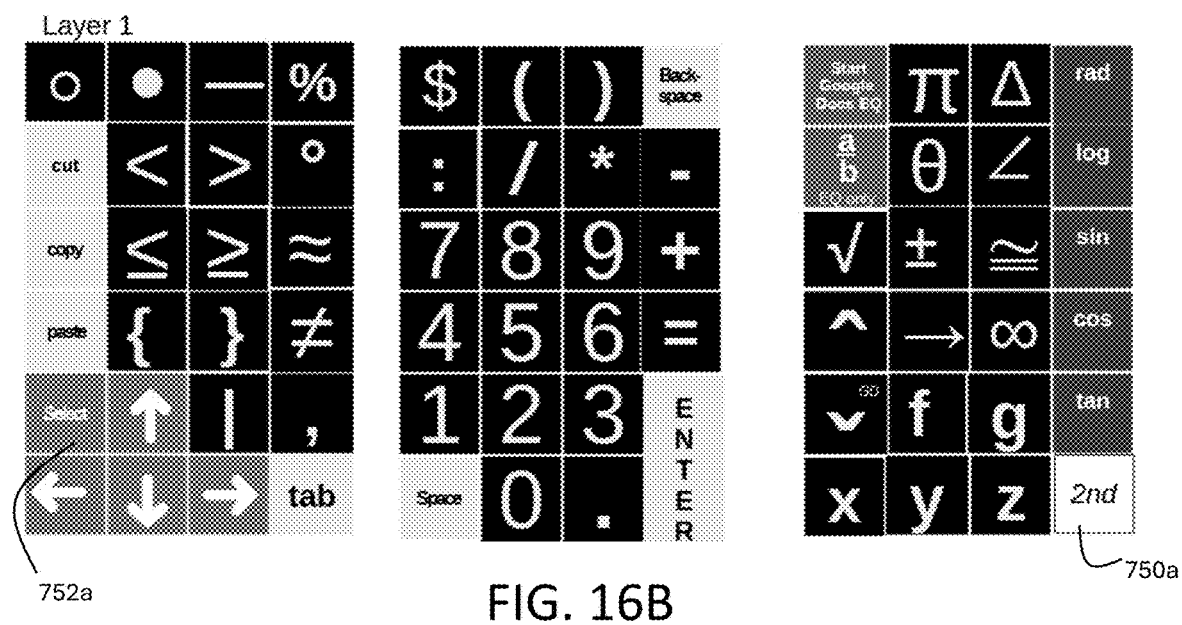
FIGS. 16B-16E are block diagrams of virtual layers of the universal keyboard of FIG. 16A, according to an embodiment.
Figure 16C:
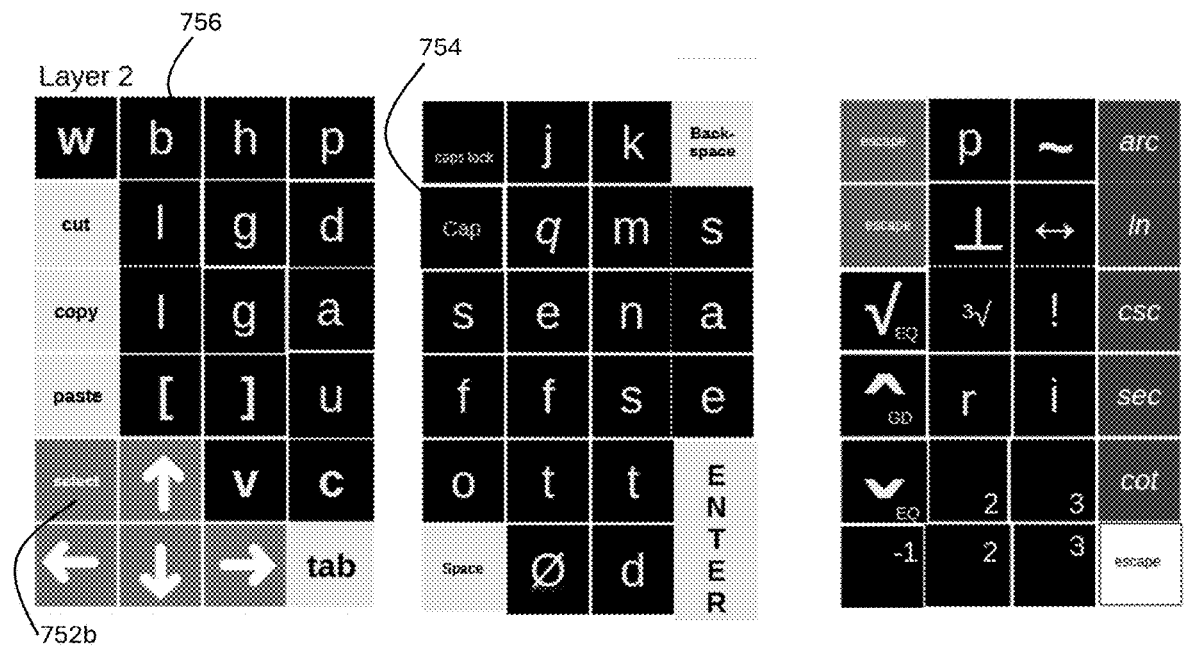
Figure 16D:
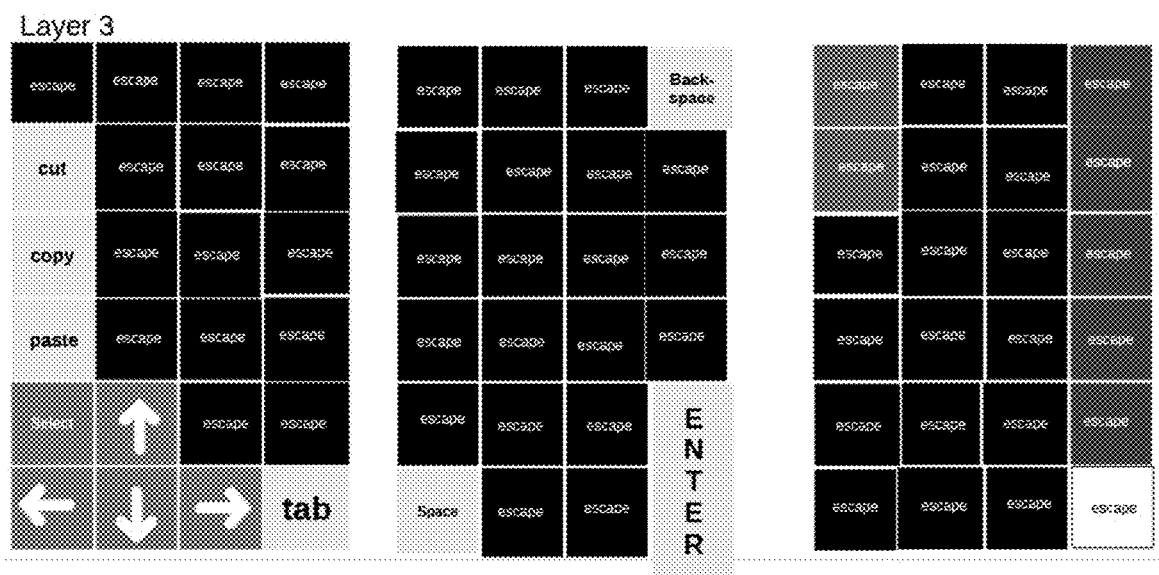
Figure 16E:
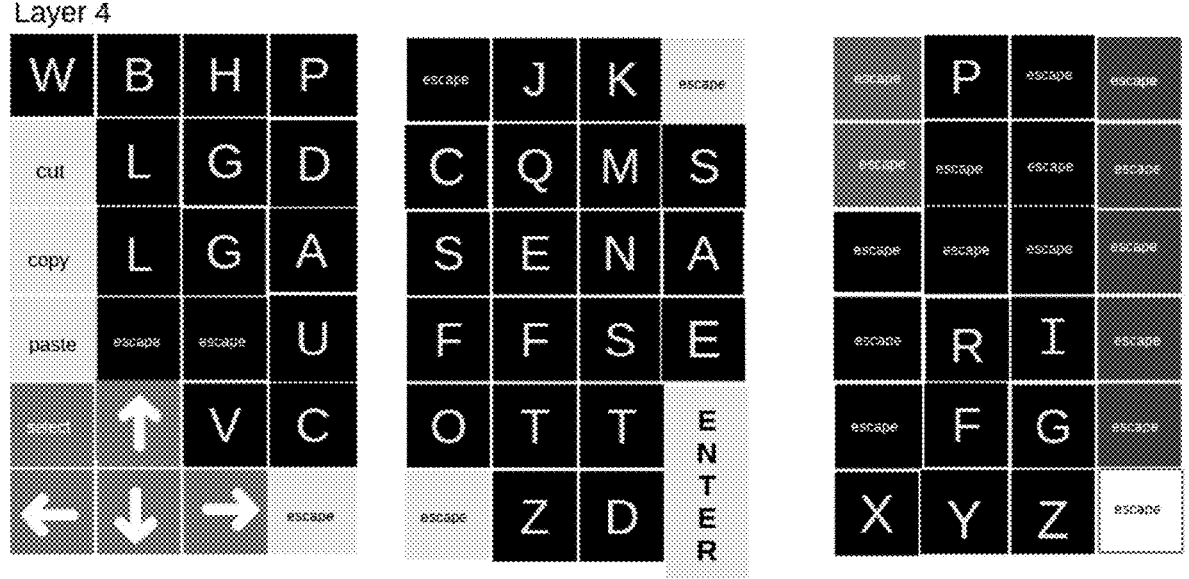

Referring further to FIGS. 16B-16E, block diagrams of virtual layers of the universal keyboard if FIG. 16A depicted, according to an embodiment. FIG. 16B depicts a first layer, FIG. 16C depicts a second layer, FIG. 16D depicts a third layer, and FIG. 16E depicts a fourth layer. The virtual layers depicted in FIGS. 16B-16E are substantially similar in operation as described with respect to FIGS. 15A-15C, with differences described and depicted herein.

In an embodiment, first layer of FIG. 16B is presented. In an embodiment, the first layer of FIG. 16B is effectively the physical layer of the keyboard of FIG. 16A. A second layer of FIG. 16C can be exposed by pressing $2^{ND}$ key 750*a*. In an embodiment, other virtual layer activation keys can activate or expose the second layer, or other layers, as will be described.

In an embodiment, single letter capitalization is activated by the second layer. For example, upon exposing the second layer (e.g. pressing $2^{ND}$ key 750*a*), a "Cap," button 754 is provided. In the second layer, a single press of Cap button 754 opens the 4th layer and then selecting a letter creates an input of a single capital letter. For example, a subsequent press of "bullet" button 756 creates a single capital "B."

A third layer of FIG. 16D can be exposed by pressing Select key 752*a* while in the first layer or Select key 752*b* while in the second layer. In an embodiment, the third layer of FIG. 16D comprises arrows and cut-copy-paste for selection of an object (e.g. text, image) and subsequent cut, copy, or paste functionality similar to third layer of FIG. 15C. A fourth layer of FIG. 16E can be exposed by pressing Cap key 754 while in the second layer.

In addition to virtual layers, embodiments of keyboard 100, 200, 300, 400 can implement operating-system specific functions formatted for the specific application and OS. For example, as illustrated in FIG. 1, keyboard 100 includes a "Start GOOGLE DOCS EQ" button. When activated, a formatting engine such as formatting engine 412 can generate a command specific to the OS, which can be transmitted by an I/O engine such as input/output engine 410 to a host device such as computing device 404 to execute or otherwise open a GOOGLE DOC equation editor on computing device 404. In other embodiments, other special functions generate and format commands specific to execute other equation editors in MS WORD or ONENOTE. Within Google Docs Equation Editor, LaTeX codes are utilized, for example a/b is coded as \frac. Further LaTeX codes can be utilized in the calculus attachments. Accordingly, embodiments further enable the typing of complex math.

Figure 17A:
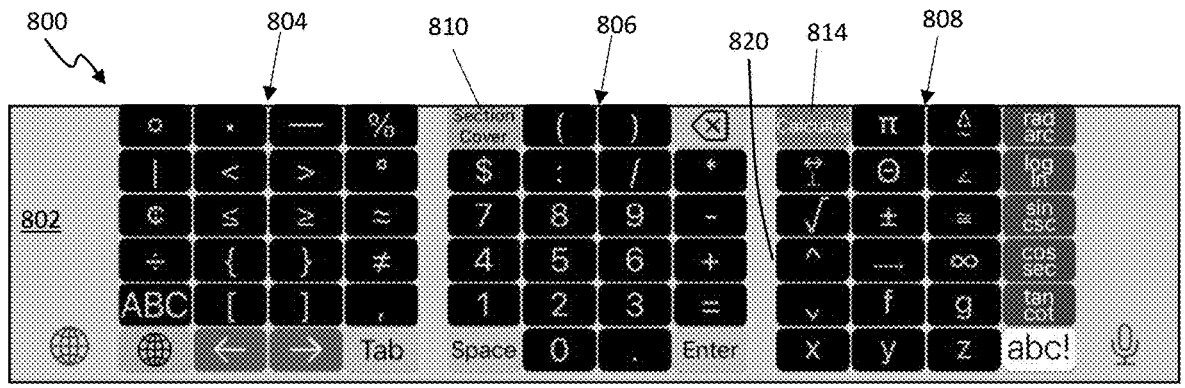
FIG. 17A is a partial screenshot of an on-screen keyboard, according to an embodiment.
Figure 17B:
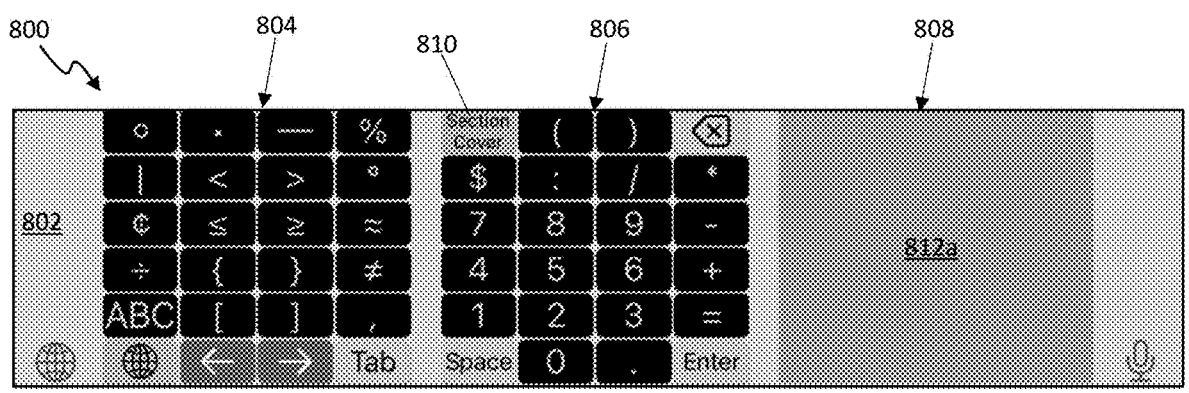
FIG. 17B is a partial screenshot of the on-screen keyboard of FIG. 17A partially covered with an on-screen section cover, according to an embodiment.
Figure 17C:
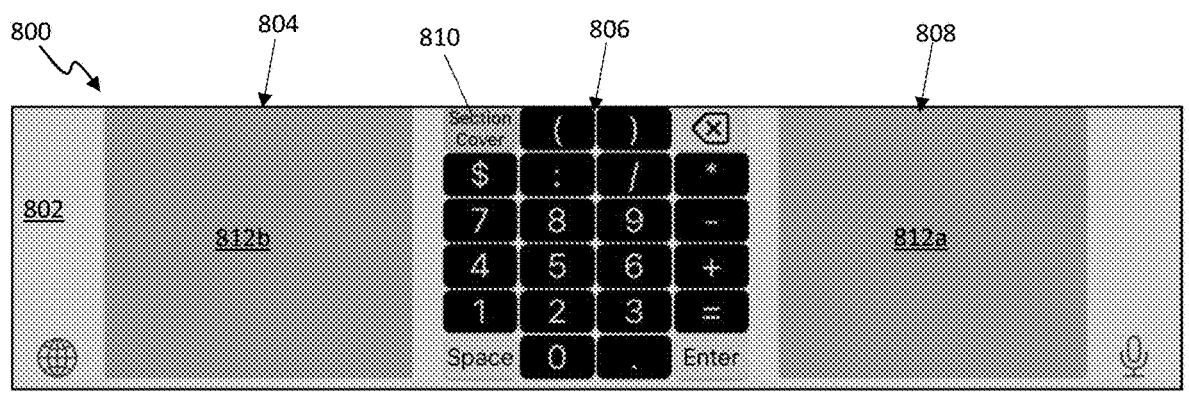
FIG. 17C is a partial screenshot of the on-screen keyboard of FIG. 17A partially covered with two on-screen section covers, according to an embodiment.

Referring generally to FIGS. 17A-17C, a block diagram of an on-screen keyboard is depicted, according to an embodiment. In embodiments, an on-screen keyboard simulates a hardware keyboard. The on-screen keyboard depicted in FIGS. 17A-17C can be implemented on a host system, such as computing device 404. In embodiments, host system can implement operating systems such as WINDOWS, MAC, LINUX, UNIX, CHROME, etc. in addition to iOS devices, and can further be portable devices like TOBII DYNAVOX assistive technology devices (e.g. for eye gaze users) or add-ons on CHROMEBOOKS. In certain embodiments, keyboard 402 can affect an installation of an on-screen keyboard on computing device 404 (such as by processor 406 in coordination with I/O engine 410). In other embodiments without a physical keyboard 402, an on-screen keyboard can be installed on host device by downloading onto the host device (e.g. by the Internet, USB, or other operable coupling). For example, an on-screen keyboard can be implemented as software or a module or engine, as described herein, on the host device resources. In operation, the on-screen keyboard can be utilized using input/output subsystems of host device, but provides the same benefits as described herein with respect to the hardware keyboards.

Referring specifically to FIG. 17A, a partial screenshot of an on-screen keyboard 800 is depicted, according to an embodiment. The screenshots in FIGS. 17A-17C include an on-screen background 802, and keyboard 800 includes a first section 804, a second section 806, and a third section 808. In embodiments, first section 804, second section 806, and third section 808 correspond to sections of on-screen keys that are associated with input to computer device 404 through resources of computing device 404. For example, on-screen keys can be selected or "pressed" by computer device 404 mouse, touchscreen, eye gaze, or other on-screen selection component. Further, on-screen keys can be interpreted by screen readers such as VOICEOVER, Job Access With Speech (JAWS), or Non-Visual Desktop Access (NVDA).

Second section 806 comprises a section cover key 810 to activate or deactivate an on-screen section cover. Once section cover key 810 is selected, an on-screen section cover such as on-screen section cover 812*a* can be selected to "cover" such that respective on-screen keys are hidden and disable one or one or more sections 804 and/or 808. For example, referring to FIG. 17B, a partial screenshot of on-screen keyboard 800 partially covered with an on-screen section cover 812*a* is depicted, according to an embodiment. On-screen section cover 812*a* disables on-screen keys of third section 808. In another example, referring to FIG. 17C, a partial screenshot of on-screen keyboard 800 partially covered with two on-screen section covers 812*a* and 812*b* is depicted, according to an embodiment. On-screen section cover 812*a* disables on-screen keys of third section 808, and on-screen section cover 812*b* disables on-screen keys of first section 804. In certain embodiments, second section 806 is not coverable with an on-screen section cover.

As illustrated in FIGS. 17B-17C, on-screen section covers 812*a*, 812*b* have a different appearance than background 802 or active keys sections (e.g. different shading or coloring) to indicate the cover and disabling of the covered section. In other embodiments, on-screen section covers 812*a*, 812*b* have the same appearance as background 802 such that the user is presented only with the non-covered section and covered sections appear to just be part of background 802.

In embodiments, on-screen section covers (e.g. 812*a*, 812*b*) can be removed by selection of section cover key 810 and subsequent indication of the on-screen section cover to remove and thus re-display and re-enable on-screen key functionality corresponding to the section 802, 806, 808 for which the cover was removed.

Figure 18A:
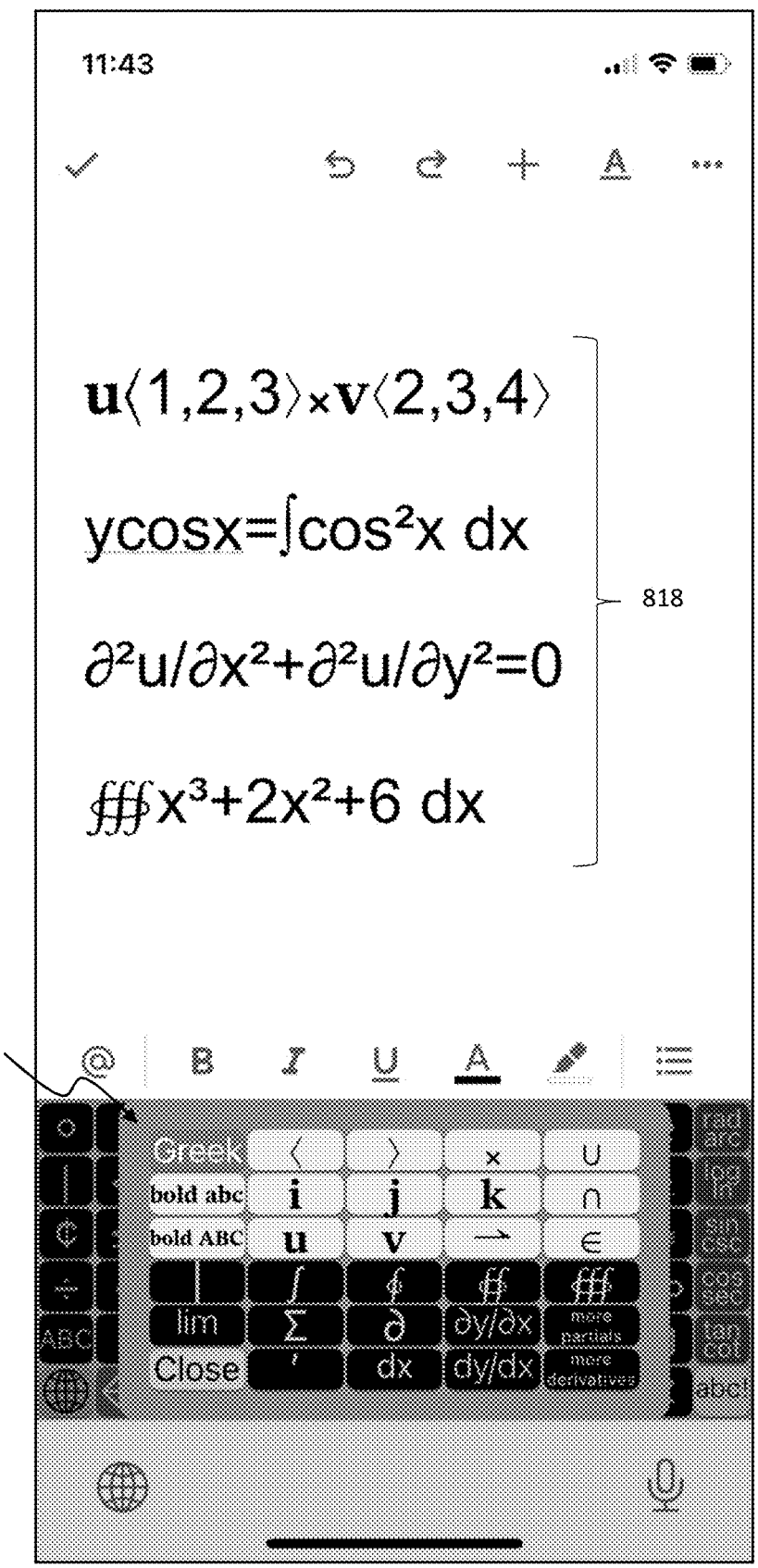
FIGS. 18A-18B are partial screenshots of on-screen keyboard popup screens, according to embodiments.
Figure 18B:
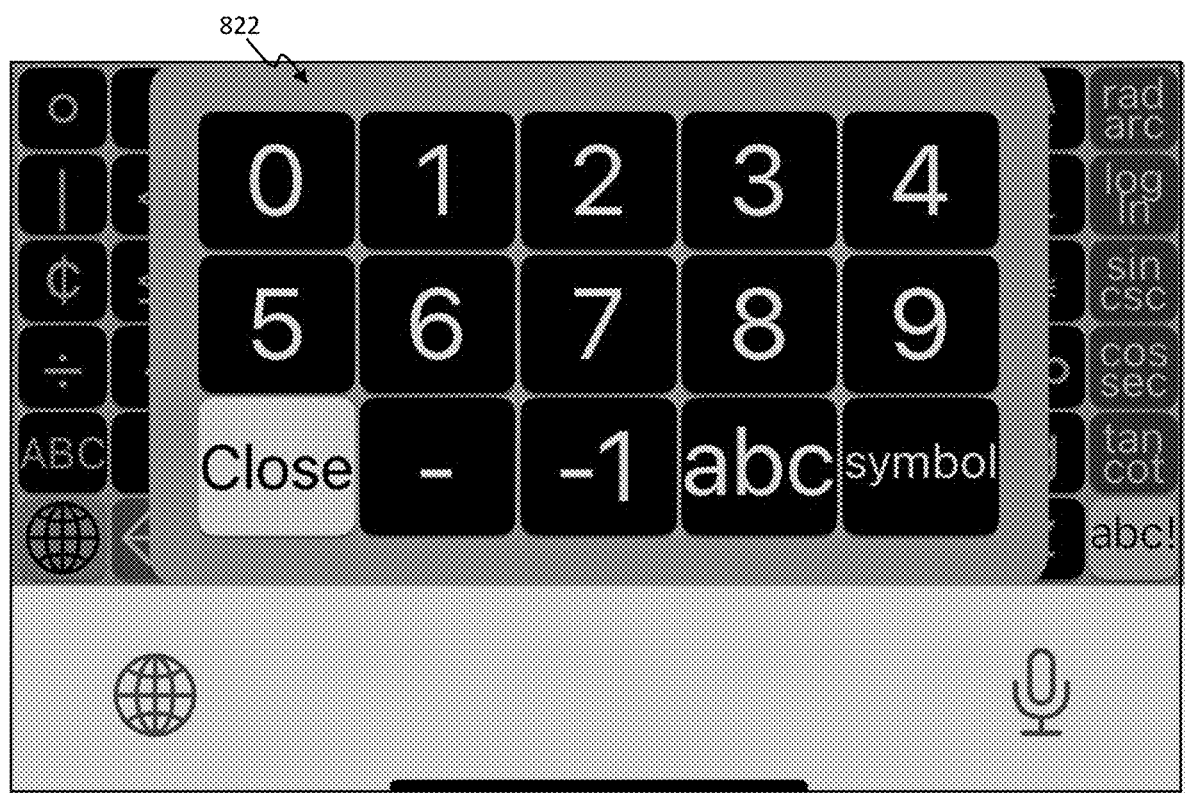

On-screen keyboards can include popup screens to expand character offerings for a particular key. Referring to FIGS. 18A-18B, partial screenshots of on-screen keyboard popup screens are depicted, according to embodiments.

For example, referring also to FIG. 17A, a user activating a "calculus" key 814 presents calculus character popup screen 816, which includes additional keys for calculus-related entries presented on top of the base on-screen keyboard. Example calculus text 818 is illustrated by activating individual keys on calculus character popup screen 816.

In another example, referring also to FIG. 17A, a user activating "^" key 820 presents exponent symbol popup screen 822, which includes additional keys for exponent-related entries presented on top of the base on-screen keyboard.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A keyboard comprising:
   a first key section comprising a first plurality of keys in a first grid having a number of rows greater than a number of columns;
   a second key section comprising a second plurality of keys in a second grid having a number of rows greater than a number of columns;
   a third key section comprising a third plurality of keys in a third grid having a number of rows greater than a number of columns,
   wherein the number of columns of the first grid, the second grid, and the third grid are the same; and
   a housing that physically separates the first key section from the second key section by a first portion of the housing having a first width and the second key section from the third key section by a second portion of the housing having a second width, wherein the first width and the second width are substantially the same.

2. The keyboard of claim 1, further comprising:
   a printed circuit board (PCB) layer comprising:
      a plurality of switches corresponding to the first plurality of keys, the second plurality of keys, and the third plurality of keys,
      at least one processor and memory operably coupled to the processor, and
      instructions that, when executed by the at least one processor, cause the at least one processor to execute:
         an input/output (I/O) engine configured to receive input of a key press from the plurality of switches, and
         a formatting engine configured to tailor the input as a packet for a host computer.

3. The keyboard of claim 2, wherein the PCB layer further comprises a plurality of mechanical actuators, wherein at least one mechanical actuator, when actuated, corresponds to selection of an operating system of the host computer, and the formatting engine is configured to tailor the packet for the operating system.

4. The keyboard of claim 2, wherein the formatting engine is configured to tailor the packet using a Unicode code sequence.

5. The keyboard of claim 2, further comprising a safety layer comprising a shell that mirrors the PCB layer and provides water-resistant protection of the PCB layer.

6. The keyboard of claim 1, wherein the first width and the second width are approximately a width of one of the first plurality of keys.

7. The keyboard of claim 1, wherein the first plurality of keys, the second plurality of keys, and the third plurality of keys correspond to a first layer of functionality, and
wherein the first plurality of keys, the second plurality of keys, or the third plurality of keys comprises a virtual layer activation key, and
wherein the virtual layer activation key, when actuated and released, exposes a second layer of functionality corresponding to different inputs for at least some of the first plurality of keys, the second plurality of keys, and the third plurality of keys in the first layer of functionality, the second layer of functionality including a common association between a majority of the first plurality of keys, the second plurality of keys, and the third plurality of keys.

8. The keyboard of claim 7, wherein the first plurality of keys, the second plurality of keys, or the third plurality of keys comprises another virtual layer activation key,
wherein the another virtual layer activation key, when actuated and released, exposes a third layer of functionality corresponding to different inputs for at least some of the first plurality of keys, the second plurality of keys, and the third plurality of keys than in the first layer of functionality and the second layer of functionality, the third layer of functionality including a common association between a majority of the first plurality of keys, the second plurality of keys, and the third plurality of keys.

9. The keyboard of claim 7, wherein the second layer of functionality corresponds to the same inputs for at least some of the first plurality of keys, the second plurality of keys, and the third plurality of keys in the first layer of functionality.

10. The keyboard of claim 1, wherein the first grid has at least three rows and at least six columns, the second grid has at least three rows and at least six columns, and the third grid has at least three rows and at least six columns.

11. The keyboard of claim 10, wherein the first plurality of keys is at least 24 keys, the second plurality of keys is at least 23 keys, and the third plurality of keys is at least 24 keys.

12. The keyboard of claim 11, wherein the second plurality of keys comprises an enter key that extends vertically across two other of the second plurality of keys between a fifth and sixth row in the second grid.

13. A keyboard system comprising:
a primary keyboard including:
a first key section comprising a first plurality of keys in a first grid having a number of rows greater than a number of columns,
a second key section comprising a second plurality of keys in a second grid having a number of rows greater than a number of columns,
a third key section comprising a third plurality of keys in a third grid having a number of rows greater than a number of columns,
a primary keyboard housing defining three apertures corresponding respectively to the first key section, the second key section, and the third key section,
wherein the number of columns of the first grid, the second grid, and the third grid are the same;
a plurality of switches corresponding to the first plurality of keys, the second plurality of keys, and the third plurality of keys;
at least one processor and memory operably coupled to the processor; and
instructions that, when executed by the at least one processor, cause the at least one processor to execute:
an input/output (I/O) engine configured to receive input of a key press from the plurality of switches, and
a formatting engine configured to tailor the input as a packet for a host computer.

14. The keyboard system of claim 13, wherein the primary keyboard housing comprises a first aperture configured to position the first plurality of keys therethrough, the system further comprising:
a section cover configured to cover the first plurality of keys by a friction fit with the first aperture and at least some of the first plurality of keys.

15. The keyboard system of claim 13, further comprising:
a keyguard comprising:
a section interface configured to create a friction fit with the primary keyboard housing, and
a series of parallel and perpendicular projections extending throughout the section interface, the projections positionable into a plurality of voids created by adjacency of the first plurality of keys.

16. The keyboard system of claim 13, further comprising a secondary keyboard including:
a fourth key section comprising a fourth plurality of keys in a fourth grid having a number of rows greater than a number of columns,
a secondary keyboard housing defining an aperture corresponding to the fourth key section, wherein the secondary keyboard is mechanically coupled to the primary keyboard by the primary keyboard housing,
wherein the number of columns of the first grid, the second grid, the third grid, and the fourth grid are the same.

17. The keyboard system of claim 16, wherein the secondary keyboard is configured to communicate with the host computer without the primary keyboard.

18. The keyboard system of claim 16, wherein the secondary keyboard is communicatively coupled to the primary keyboard, wherein inputs from the secondary keyboard are relayed to the host computer through primary keyboard.

19. A method for universal keyboard communication, the method comprising:
providing a keyboard including:
a first key section comprising a first plurality of keys in a first grid having a number of rows greater than a number of columns,
a second key section comprising a second plurality of keys in a second grid having a number of rows greater than a number of columns,
a third key section comprising a third plurality of keys in a third grid having a number of rows greater than a number of columns,
wherein the number of columns of the first grid, the second grid, and the third grid are the same;
an actuator configured to mechanically switch between a plurality of host computer operating systems;
receiving actuator input from the actuator indicative of a selected host computer operating system;
receiving key input from the first plurality of keys, the second plurality of keys, or the third plurality of keys;
formatting a tailored packet of the key input for the host computer specific to the host computer operating system based on the actuator input; and
transmitting the tailored packet to the host computer.

20. The method of claim 19, further comprising tailoring the packet using a Unicode code sequence.

\* \* \* \* \*